(12) United States Patent
Tachibana et al.

(10) Patent No.: US 11,181,636 B2
(45) Date of Patent: Nov. 23, 2021

(54) ELECTRONIC APPARATUS AND METHOD OF DETECTING INFORMATION ABOUT TARGET OBJECT BY USING ULTRASOUND WAVES

(71) Applicant: SAMSUNG ELECTRONICS CO., LTD., Suwon-si (KR)

(72) Inventors: Hiromi Tachibana, Kanagawa (JP); Atsuya Yokoi, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 464 days.

(21) Appl. No.: 15/789,532

(22) Filed: Oct. 20, 2017

(65) Prior Publication Data

US 2018/0113212 A1 Apr. 26, 2018

(30) Foreign Application Priority Data

Oct. 20, 2016 (JP) .............................. JP2016-205748
Jul. 27, 2017 (JP) .............................. JP2017-145573
Oct. 10, 2017 (KR) ........................ 10-2017-0129108

(51) Int. Cl.
*G01S 15/88* (2006.01)
*G01S 15/32* (2006.01)

(52) U.S. Cl.
CPC .................................... *G01S 15/32* (2013.01)

(58) Field of Classification Search
None
See application file for complete search history.

(56) References Cited

U.S. PATENT DOCUMENTS 4,065,744 A * 12/1977 Delignieres ............. G01S 15/60
367/87
4,244,026 A * 1/1981 Dickey, Jr. ............. G01S 15/60
702/143
(Continued)

FOREIGN PATENT DOCUMENTS

JP 9-318738 A 12/1997
JP 2002-55158 A 2/2002
(Continued)

OTHER PUBLICATIONS

Tanzawa, Tsutomu, Takafumi Watanabe, and Noriaki Kiyohiro. "The fast calculating method for ultrasonic range finder with correlation." Journal of the Robotics Society of Japan 15.8 (1997): 1133-1138. (Year: 1997).*

(Continued)

*Primary Examiner* — Isam A Alsomiri
*Assistant Examiner* — Jonathan D Armstrong
(74) *Attorney, Agent, or Firm* — Sughrue Mion, PLLC

(57) ABSTRACT

Provided is an electronic apparatus for detecting information about a target object by using an ultrasound wave. The electronic apparatus includes: a transmitter configured to emit an ultrasound wave modulated based on a predetermined code signal; a receiver configured to receive a reflected signal corresponding to the emitted ultrasound wave reflected from a target object; and a controller configured to acquire a reception signal from the received reflected signal and detect information about the target object based on a difference between correlation values corresponding to a plurality of predetermined periods of the reception signal and the predetermined code signal.

15 Claims, 24 Drawing Sheets

(56) References Cited

U.S. PATENT DOCUMENTS

| | | | | |
|---|---|---|---|---|
| 4,320,765 | A | * | 3/1982 | Cathignol ............... A61B 8/06 367/100 |
| 4,549,169 | A | * | 10/1985 | Moura ................. B63C 9/0005 340/539.11 |
| 5,662,113 | A | * | 9/1997 | Liu ......................... G06T 5/003 382/128 |
| 5,872,806 | A | * | 2/1999 | Enderlein .............. H04B 1/707 375/130 |
| 6,133,826 | A | * | 10/2000 | Sparling ............... B60Q 9/007 340/435 |
| 6,348,856 | B1 | * | 2/2002 | Jones .................... G01S 15/876 340/10.1 |
| 6,710,719 | B1 | * | 3/2004 | Jones ........................ G01S 5/14 340/10.2 |
| 6,870,792 | B2 | * | 3/2005 | Chiappetta ............. B62D 61/10 367/98 |
| 7,199,751 | B2 | | 4/2007 | Mikami et al. |
| 7,817,835 | B2 | * | 10/2010 | Fan ............................ G06T 7/32 382/130 |
| 8,164,467 | B2 | * | 4/2012 | Hirabayashi ......... G05B 19/042 340/636.1 |
| 9,810,784 | B2 | | 11/2017 | Altman et al. |
| 2008/0218351 | A1 | * | 9/2008 | Corrado ............. G06K 19/0705 340/572.4 |
| 2011/0009194 | A1 | * | 1/2011 | Gabai ................... G01S 5/0036 463/36 |
| 2011/0096632 | A1 | * | 4/2011 | Pearce ................... H04B 11/00 367/131 |
| 2013/0046168 | A1 | * | 2/2013 | Sui .......................... A61B 8/14 600/411 |
| 2013/0099922 | A1 | * | 4/2013 | Lohbihler ............ G08B 13/184 340/539.17 |
| 2013/0301391 | A1 | * | 11/2013 | Altman ................. G01S 15/003 367/100 |
| 2013/0346019 | A1 | | 12/2013 | Takai et al. |
| 2015/0212197 | A1 | | 7/2015 | Morita et al. |
| 2015/0253424 | A1 | | 9/2015 | Cheatham, III et al. |
| 2016/0054440 | A1 | * | 2/2016 | Younis ................... G01S 13/753 342/5 |
| 2018/0156907 | A1 | * | 6/2018 | Cegla ..................... G01S 13/22 |

FOREIGN PATENT DOCUMENTS

| | | | | |
|---|---|---|---|---|
| JP | 2002055158 | A | * 2/2002 | ........... G01S 13/288 |
| JP | 2005-351862 | A | 12/2005 | |
| JP | 2006-105887 | A | 4/2006 | |
| JP | 2006-108987 | A | 4/2006 | |
| JP | 2007-170975 | A | 7/2007 | |
| JP | 2007-278805 | A | 10/2007 | |
| JP | 2009075086 | A | 4/2009 | |
| JP | 2009-222445 | A | 10/2009 | |
| JP | 2014-232069 | A | 12/2014 | |
| JP | 2015054006 | A | 3/2015 | |
| JP | 2015-141174 | A | 8/2015 | |
| JP | 2015-175714 | A | 10/2015 | |
| JP | 2016112252 | A | 6/2016 | |
| KR | 1020130137005 | A | 12/2013 | |
| WO | 2012/066541 | A2 | 5/2012 | |
| WO | 2012/077345 | A1 | 6/2012 | |
| WO | 2012/127671 | A1 | 9/2012 | |

OTHER PUBLICATIONS

Kodama, Tetsuji, et al. "Application of digital polarity correlators in a sonar ranging system." Electronics and Communications in Japan 91.4 (2008): 20-26. (Year: 2008).*

Segers, Laurent, et al. "An ultrasonic multiple-access ranging core based on frequency shift keying towards indoor localization." Sensors 15.8 (2015): 18641-18665. (Year: 2015).*

Communication dated Jun. 28, 2019 issued by the European Intellectual Property Office in counterpart European Application No. 17862558.8.

International Search Report and Written Opinion (PCT/ISA/210 and PCT/ISA/237), dated Feb. 12, 2018 by International Searching Authority in International Application No. PCT/KR2017/011693.

Communication dated Feb. 9, 2021 issued by the Indian Patent Office in Indian Application No. 201947010692.

* cited by examiner

ELECTRONIC APPARATUS AND METHOD OF DETECTING INFORMATION ABOUT TARGET OBJECT BY USING ULTRASOUND WAVES

CROSS-REFERENCE TO RELATED APPLICATIONS

This application claims priority from Japanese Patent Application No. 2016-205748, filed on Oct. 20, 2016 and Japanese Patent Application No. 2017-145573, filed on Jul. 27, 2017, in the Japanese Patent Office and Korean Patent Application No. 10-2017-0129108, filed on Oct. 10, 2017, in the Korean Intellectual Property Office, the disclosures of which are incorporated herein in their entireties by reference.

BACKGROUND

Field

Apparatuses and methods consistent with exemplary embodiments relate to electronic apparatuses and methods of detecting information about a target object by using ultrasound waves.

Description of the Related Art

An ultrasonic sensor transmits an ultrasound signal generated by an ultrasound transmitter to a target object and receives an ultrasound echo signal reflected from the target object, thereby obtaining information about the position and movement of the target object.

For example, an ultrasonic sensor may measure a distance between its position and a target object based on the time elapsed between emission of a transmission signal and detection of a reflected signal. A method of measuring the distance in this way is referred to as a time of flight (TOF) method.

However, if the distance between an ultrasonic sensor and a target object is so long that the ultrasound signal is greatly attenuated or only a small amount of the ultrasound signal is reflected from a surface of the target object, the intensity of the reflected signal may decrease. When the intensity of a reflected signal decreases, it is difficult to accurately measure a signal related to the target object due to noise contained in the reflected signal.

Thus, there is a need for techniques for accurately detecting information about a target object by using ultrasound signals even when the intensity of a reflected signal is low.

SUMMARY

One or more exemplary embodiments may provide methods of detecting information about a target object by using ultrasound waves and electronic apparatuses for performing the methods.

Additional exemplary aspects and advantages will be set forth in part in the description which follows and, in part, will be apparent from the description, or may be learned by practice of the presented embodiments.

According to an aspect of an exemplary embodiment, an electronic apparatus includes: a transmitter configured to emit an ultrasound wave modulated based on a predetermined code signal; a receiver configured to receive a reflected signal corresponding to the emitted ultrasound wave reflected from a target object; and a controller configured to acquire a reception signal from the received reflected signal and detect information about the target object based on a difference among correlation values of the reception signal and the predetermined code signal, the correlation values.

According to an aspect of another exemplary embodiment, a method, performed by an electronic apparatus, of detecting information about a target object by using an ultrasound wave includes: emitting an ultrasound wave modulated based on a predetermined code signal; receiving a reflected signal corresponding to the emitted ultrasound wave reflected from a target object; acquiring a reception signal from the received reflected signal; and detecting information about the target object based on a difference among correlation values of the reception signal and the predetermined code signal, the correlation values corresponding to a plurality of predetermined periods.

According to an aspect of another exemplary embodiment, a non-transitory computer-readable recording medium has recorded thereon a program for executing the method on a computer.

According to exemplary embodiments, even when the intensity of a reflected ultrasound signal is low, information about a target object may be detected with a high precision.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
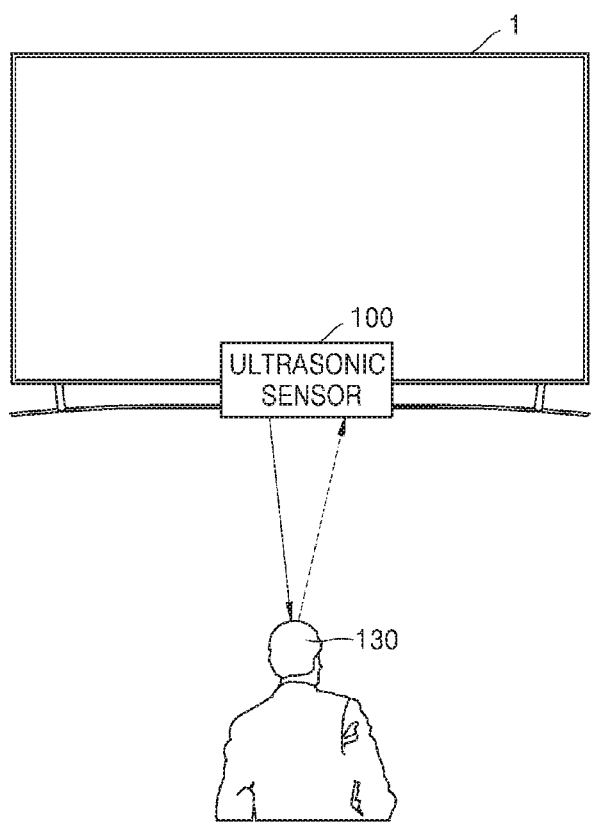
FIG. 1 illustrates an example of an electronic apparatus according to an exemplary embodiment.

Exemplary embodiments will now be described more fully hereinafter with reference to the accompanying drawings so that they may be easily implemented by one of ordinary skill in the art. However, the present embodiments may have different forms and should not be construed as being limited to the descriptions set forth herein. In addition, merely peripheral parts are omitted to clarify the description of exemplary embodiments. Like reference numerals denote like elements throughout.

Throughout the specification, it will be understood that when an element is referred to as being "connected" or "coupled" to another element, it can be directly connected to or electrically coupled to the other element with one or more intervening elements interposed therebetween. It will be further understood that the terms "includes", "comprises", "including", and/or "comprising" used in this specification, unless there is a particular description contrary thereto, specify the presence of stated elements and/or components, but do not preclude the presence or addition of another element and/or component. Expressions such as "at least one of," when preceding a list of elements, modify the entire list of elements and do not modify the individual elements of the list.

Exemplary embodiments will now be described in more detail with reference to the accompanying drawings.

FIG. 1 illustrates an example of an electronic apparatus 1 according to an exemplary embodiment.

The electronic apparatus 1 according to the present embodiment may include an ultrasonic sensor 100 that detects information about a target object 130 by using ultrasound waves. For example, the electronic apparatus 1 may acquire at least one piece of information from among pieces of information about position and movement of the target object 130 and the number thereof by using ultrasound waves.

The ultrasonic sensor 100 may be organically coupled to the electronic apparatus 1, but exemplary embodiments are not limited thereto. The ultrasonic sensor 100 may be combined with the electronic apparatus 1a or may be separate and may independently detect information about the target object 130 and transmit the detected information to the electronic apparatus 1.

According to an exemplary embodiment, the target object 130 may be an object that is to be detected by the ultrasonic sensor 100 and may be a moving object such as a moving human-body, another living organism, a car, or a part thereof. A non-target object (not shown) is an object other than the target object 130 and may be a non-moving, stationary object.

According to an exemplary embodiment, the electronic apparatus 1 may emit an ultrasound wave modulated based on a predetermined code signal and receive an echo signal corresponding to the ultrasound wave reflected from the target object 130. Furthermore, the electronic apparatus 1 may acquire a reception signal from the echo signal and calculate a difference between correlation values corresponding to a plurality of predetermined periods of the reception signal and the predetermined code signal. A correlation value represents the degree of relationship between two variables. The electronic apparatus 1 may detect information about the target object 130 based on the difference between correlation values.

According to an exemplary embodiment, the electronic apparatus 1 may provide a user with various functions based on the information about the target object 130 detected by using ultrasound waves.

For example, the electronic apparatus 1 may automatically turn its power on or off based on position information of the target object 130 that is the user.

As another example, the electronic apparatus 1 may control a brightness of a display of the electronic apparatus 1 based on position information of the target object 130.

As another example, if it is determined, based on position information of the target object 130, that the target object 130 is located within a predetermined distance from the electronic apparatus 1, the electronic apparatus 1 may operate a camera inside or outside the electronic apparatus 1. The camera may capture an image of the target object 130 according to control by the electronic apparatus 1. A still image or moving image captured by the camera may be recorded onto a memory or be displayed on a user's monitor.

As another example, based on position information of the target object 130, lighting may be turned on at a position estimated as a point where the target object 130 exists.

Hereinafter, the presence or absence of the target object 130 may be determined by determining whether the target object 130 is located within a predetermined distance from the electronic apparatus 1.

According to an exemplary embodiment, the electronic apparatus 1 may be an apparatus capable of detecting information about the target object 130 by using ultrasound waves directed at a fixed position and providing the user with various functions based on the detected information. Furthermore, according to an exemplary embodiment, the electronic apparatus 1 is not limited thereto, and may be a movable device. For example, the electronic apparatus 1 may be a mobile device such as a smart phone, a tablet PC, a personal digital assistant (PDA), an MP3 player, a wearable device such as a wrist watch or head-mounted display (HMD), etc., or may be a stationary device located at a fixed position, such a navigation device, a kiosk, an electronic photo frame, a digital TV, or other household appliances. Embodiments are not limited thereto, and the electronic apparatus 1 may be any of various types of devices capable of providing specific functions to the user by utilizing information about the target object 130.

Figure 2:
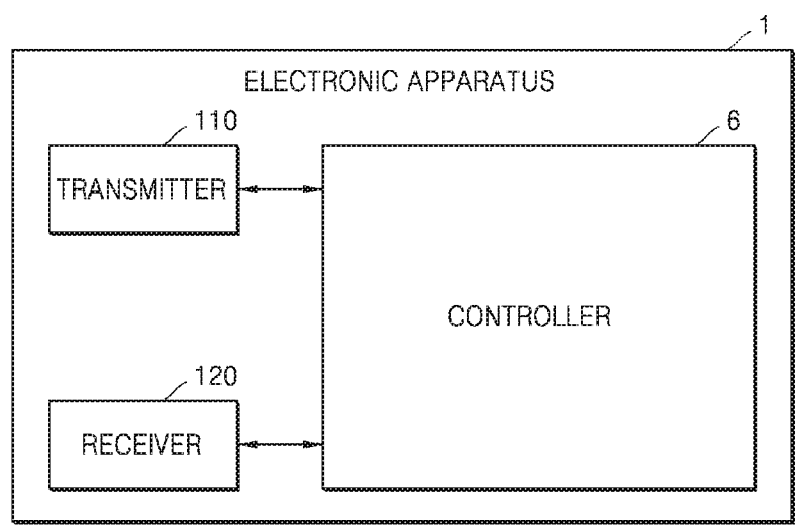
FIGS. 2 and 3 are block diagrams of electronic apparatuses according to exemplary embodiments.

FIG. 2 is a block diagram of a configuration of an electronic apparatus 1 according to an exemplary embodiment.

Referring to FIG. 2, the electronic apparatus 1 may include a transmitter 110, a receiver 120, and a controller 6.

The transmitter 110 may emit an ultrasound wave modulated based on a predetermined code signal. According to an exemplary embodiment, the predetermined code signal may be a code sequence having a periodic pattern, e.g., a pseudo noise (PN) sequence.

The receiver 120 may receive an echo signal corresponding to the ultrasound wave emitted by the transmitter 110 and then reflected from the target object (130 of FIG. 1).

According to an exemplary embodiment, the receiver 120 may receive not only an echo signal reflected from the target object 130 but also a signal corresponding to an ultrasound wave reflected from a non-target object (not shown) and a direct wave that is a part of the ultrasound wave emitted by the transmitter 110. According to an exemplary embodiment, since the signal reflected from the non-target object and the direct wave are not needed to detect information about the target object 130, and therefore, they may be processed as noise.

The controller 6 may detect information about the target object 130 by using the echo signal received by the receiver 120. The controller 6 may acquire a reception signal from the echo signal and detect information about the target object 130 based on a difference between correlation values corresponding to a plurality of predetermined periods of the reception signal and the predetermined code signal. For example, the controller 6 may detect information about the target object 130 based on a difference between correlation values respectively corresponding to the predetermined period and its subsequent period. The reception signal may be acquired by demodulating the received echo signal.

According to an exemplary embodiment, the controller 6 may be implemented as hardware or software or as a combination of hardware and software. Furthermore, the controller 6 may control the transmitter 110 and the receiver 120.

According to an exemplary embodiment, the controller 6 may further include a communication interface (not shown) equipped on the electronic apparatus 1 to communicate with an external device. The controller 6 may detect information about the target object 130 and transmit the detected information to the electronic apparatus 1 according to control by the electronic apparatus 1 via the communication interface.

Figure 3:
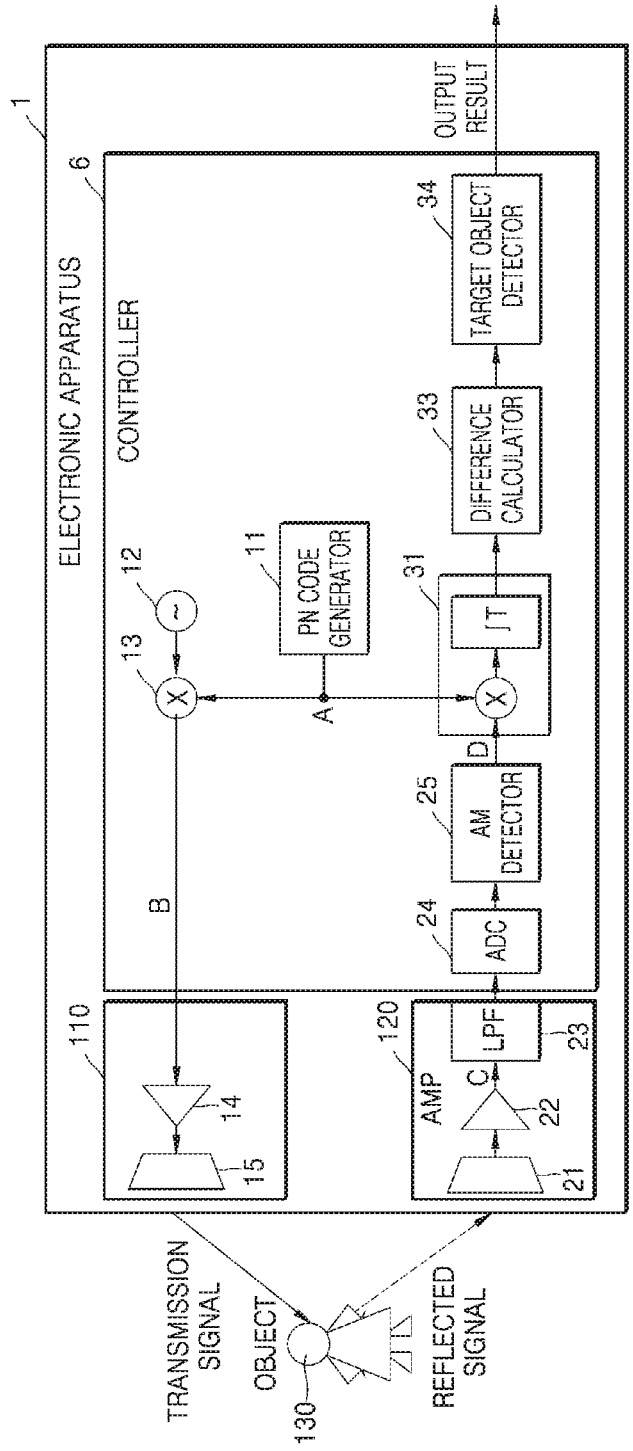

FIG. 3 is a block diagram of a configuration of an electronic apparatus 1 according to an exemplary embodiment.

Referring to FIG. 3, the electronic apparatus 1 according to the present embodiment may include a controller 6, a transmitter 110, and a receiver 120.

The transmitter 110 may include a driver circuit 14 and an ultrasonic transmitter 15, and the receiver 120 may include an ultrasonic receiver 21, an amplifier 22, and a low-pass filter (LPF) 23.

The controller 6 may include components for outputting a transmission signal, including a PN code generator 11, a carrier signal generator 12, and a mixer 13 Furthermore, the controller 6 may include components for receiving a reflected signal and acquiring information about a target object 130, including an analog-to-digital converter (ADC) 24, an amplitude modulation (AM) detector 25, a correlation calculator 31, a difference calculator 33, and a target object detector 34.

Since the controller 6, the transmitter 110, and the receiver 120 correspond to their counterparts as described with reference to FIG. 2, descriptions thereof will not be repeated below.

The PN code generator 11 generates a PN code A having a specific pattern and period at a predetermined frequency. A PN code is a periodic code having a distribution in which a value at each instant of one period appears nearly random. Since the PN code has a spectrum that is very similar to that of white noise, it is referred to as a pseudo-noise code.

For example, the PN code generator 11 may generate a maximum length shift register sequence (M-sequence) code with a period of 127 bits according to X7+X3+1 that is a polynomial for generating a PN code. If a predetermined frequency of a PN code is 1 kHz, the PN code generator 11 may generate a PN code A having a value "0" or "1" at time intervals of 1 ms and with a period of 127 ms. The PN code generator 11 may output the PN code A to the mixer 13 and the correlation value calculator 31.

The carrier signal generator may generate a carrier signal having a predetermined frequency (e.g., 40 kHz) and output the carrier signal to the mixer 13. An ultrasound signal may be modulated according to the carrier signal and then emitted to the outside through the transmitter 110.

The mixer 13 may perform AM on the carrier signal by using the PN code A and output the modulated signal B to the driver circuit 14. For example, the mixer 13 may modulate the carrier signal by using an AM technique such as on-off keying.

The driver circuit 14 may amplify the modulated signal B by a predetermined value and output the resulting signal B to the ultrasonic transmitter 15.

The ultrasonic transmitter 15 may convert the resulting signal B into an ultrasound wave and emit the ultrasound wave as a transmission signal.

The ultrasonic receiver 21 may receive an echo signal corresponding to the ultrasound wave emitted by the ultrasonic transmitter 15 and then reflected from at least one of the target object 130 and a non-target object (not shown). The ultrasonic receiver 21 may convert the echo signal into an electrical signal and output the electrical signal to the amplifier 22.

According to an exemplary embodiment, the ultrasonic receiver 21 may operate like a band-pass filter for filtering an echo signal in an unnecessary frequency band. For example, the ultrasonic receiver 21 may perform bandpass filtering on received echo signals to pass only a signal in a frequency band around the frequency (e.g., 40 kHz) of the ultrasound wave emitted by the ultrasonic transmitter 15.

The amplifier 22 may amplify the electrical signal received from the ultrasonic receiver 21 and output a reception signal C, that is the amplified electrical signal, to the ADC 24. As the ultrasonic receiver 21 outputs a band-pass filtered signal, the reception signal C may have a limited frequency band.

The ADC 24 converts the reception signal C into a digital signal and outputs the digital signal to the AM detector 25. A sampling frequency of the ADC 24 may be set to a frequency that is greater than or equal to twice a carrier frequency, e.g., to 100 kHz that is greater than or equal to twice of 40 kHz, according to a sampling theorem.

According to an exemplary embodiment, the LPF 23 may be provided in front of the ADC 24, as shown in FIG. 3. The LPF 23 may provide a function of an anti-aliasing filter for preventing interference due to a high-frequency component.

The AM detector 25 may recover an original signal by demodulating the reception signal C that is a digital signal. For example, the AM detector 25 may find an envelope of the reception signal C and obtain a demodulated reception signal D from the envelope by calculating an absolute value of the reception signal C and filtering the reception signal C. The AM detector 25 may also output the demodulated reception signal D to the correlation value calculator 31.

The correlation value calculator 31 may calculate a correlation value by performing correlation between the demodulated reception signal D and the PN code A. For example, the correlation value calculator 31 may calculate a correlation value between a signal corresponding to a previous one period (127 ms) of the demodulated reception signal D and a signal corresponding to one period of the PN code A for each sample of the demodulated reception signal D (e.g., for each time interval of 0.01 ms when the sampling frequency of the ADC 24 is 100 kHz). The correlation value may then be output to the difference calculator 33.

The correlation calculator 31 may calculate a correlation value Corr(i) by using Equation (1) below, based on a sample number i, a signal sample row r(i) after AM detection, a PN code PN(p) (identical to a PN code at a transmitter side) having the same sampling frequency as signal sample row r(i), and a period NPN (equal to a sampling period) of a PN code.

$$\text{Corr}(i) = \sum_{p=1}^{N_{PN}} r(i - N_{PN} + p) \cdot PN(p) \quad (1)$$

The correlation value calculator 31 may calculate a number of correlation values corresponding to a predetermined sampling frequency that is the number of samples per second. A sampling frequency for calculating a correlation value may be set lower than a sampling frequency of the ADC 24 but exemplary embodiments are not limited thereto. The sampling frequency for calculating a correlation value may be set to a range of 1 to 100 kHz in consideration of a time resolution of the electronic apparatus 1. For example, if the sampling frequency for calculating a correlation value is 10 kHz, the correlation value calculator 31 may calculate correlation values Corr(i) by multiplying 1,270 samples in signal sample row r(i) by 1,270 samples in PN code PN(p) at time intervals of 0.1 ms.

The difference calculator 33 may calculate a difference between correlation values respectively corresponding to a plurality of predetermined periods from the correlation values Corr(i). According to an exemplary embodiment, the difference calculator 33 may calculate a difference between correlation values respectively corresponding to a predetermined period and its subsequent period. For example, as defined in Equation (2) below, the difference calculator 33 may calculate a difference FrameDifference(i) between correlation values corresponding to frames (hereinafter, referred to as an "inter-frame difference FrameDifference(i) between correlation values") by using a square error method ((A−B)2). In the inter-frame difference FrameDifference(i) between correlation values, a "frame" may correspond to a time interval corresponding to one period of a PN code.

$$\text{Frame Difference}(i) = \sum_{k=1}^{N_{PN}} \{\text{Corr}(i+k) - \text{Corr}(i - N_{PN} + k)\}^2 \quad (2)$$

The difference calculator 33 may obtain an inter-frame difference FrameDifference(i) between correlation values for each frame (e.g., at time intervals of 127 ms). Exemplary embodiments are not limited thereto, and the difference calculator 33 may calculate an inter-frame difference FrameDifference(i) between correlation values every a half frame (63.5 ms) or every two frames (254 ms).

Furthermore, the difference calculator 33 may calculate an inter-frame difference FrameDifference(i) between correlation values by using other mathematical equations for quantifying a difference between correlation values than the square error method defined by Equation (2) above. For example, the difference calculator 33 may calculate an inter-frame difference FrameDifference(i) by using a root mean square (RMS) method.

Furthermore, the difference calculator 33 may calculate an inter-frame difference FrameDifference(i) by using Equation (3) below instead of the square error method and RMS method. In Equation (3), an inter-frame difference FrameDifference(i) may be determined based on an absolute value of a difference between correlation values corresponding to two frames. By using Equation (3) involving an absolute value, the amount of computation by the difference calculator 33 may be reduced compared to when using the square error method and the RMS method.

$$\text{Frame Difference}(i) = \sum_{k=1}^{N_{PN}} |\text{Corr}(i+k) - \text{Corr}(i - N_{PN} + k)| \quad (3)$$

The target object detector 34 may detect information about the target object 130 based on a difference between correlation values. For example, the target object detector 34 may determine whether the target object 130 is located within a predetermined distance from the electronic apparatus 1 based on whether the difference exceeds a predetermined threshold.

According to an exemplary embodiment, a difference between correlation values corresponding to a plurality of predetermined periods of a reception signal and a predetermined code signal may represent a degree to which the correlation values vary. For example, since the degree of fluctuation of a reflected signal increases by an extent to which the target object 130 moves, the degree of variation of correlation values may increase. On the other hand, if the stationary non-target object exists, a correlation value may remain almost unchanged because it does not move. Thus, by using the above characteristics, the target object detector 34 may determine the presence or absence of the target object 130 according to whether an inter-frame difference between correlation values exceeds a predetermined threshold.

According to an exemplary embodiment, the threshold may be preset based on an inter-frame difference between correlation values, which is obtained when the target object 130 is not within a predetermined distance from the electronic apparatus 1. For example, the threshold may be preset to a value greater than an inter-frame difference between correlation values, which is obtained when the target object 130 is not within the predetermined distance from the electronic apparatus 1.

Furthermore, even when a reflected signal has a low intensity, the target object detector 34 may determine the presence or absence of the target object 130 with high precision by using an inter-frame difference between correlation values not affected by the intensity of a reflected signal.

In addition, components of the controller 6 may be implemented by executing a program according to control by an arithmetic unit (not shown) included in the controller 6.

For example, the controller 6 may load a program stored in a storage (not shown) onto a main memory (not shown) and execute the program according to control by the arithmetic unit. Each of the components of the controller 6 may be implemented not only as software through execution of a program but also as any combination of hardware, firmware, and software.

Furthermore, according to an exemplary embodiment, in the electronic apparatus 1, the AM detector 25 may be configured as an analog circuit, and the ADC 24 may convert the demodulated reception signal D obtained after AM detection into a digital reception signal. In this case, a sampling frequency of the ADC 24 may decrease to about 10 kHz.

Furthermore, according to an exemplary embodiment, the electronic apparatus 1 may change a modulation technique applied to a transmission signal according to a modulation technique applied to a reception signal and use other modulation techniques such as frequency modulation (FM) and binary phase shift keying (BPSK) modulation instead of the AM method described above. Furthermore, according to an exemplary embodiment, the electronic apparatus 1 may include either a plurality of ultrasonic transmitters 1 or a plurality of ultrasonic receivers 21. The electronic apparatus 1 may perform triangulation calculations by using a plurality of pieces of information about distances measured between a plurality of ultrasonic transmitters 15 or between a plurality of ultrasonic receivers 21. Thus, the electronic apparatus 1 including the plurality of ultrasonic transmitters 15 or the plurality of ultrasonic receivers 21 may calculate a distance to the target object 130 as well as an orientation, position, and three-dimensional (3D) coordinates of the target object.

Furthermore, according to an exemplary embodiment, the electronic apparatus 1 may be constituted by a sensor for detecting information about the target object 130 by using other types of signals than ultrasound waves, such as radio waves, light rays, etc.

Figure 4:
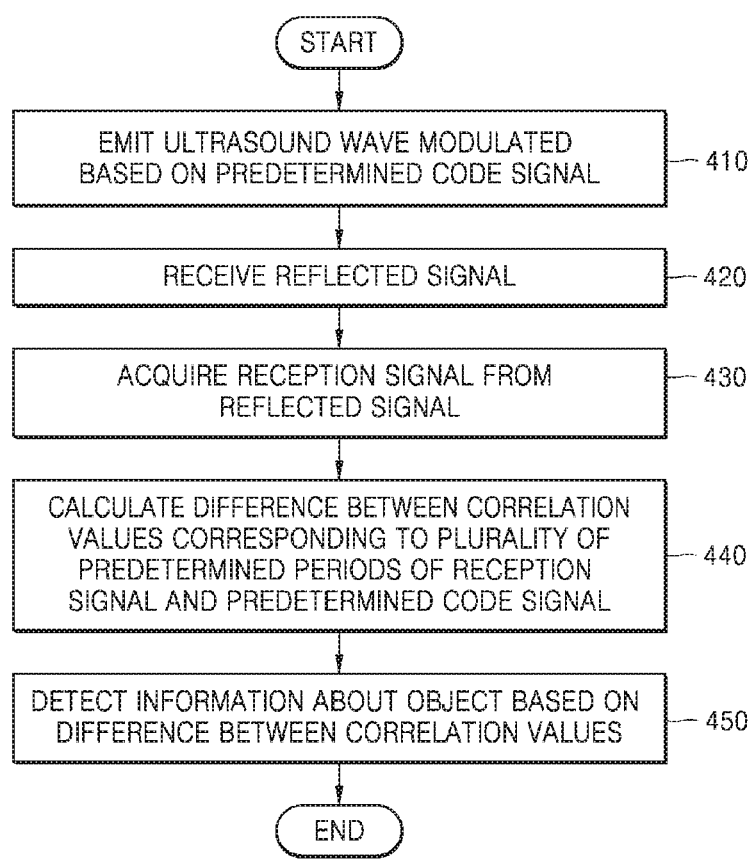
FIG. 4 is a flowchart of a method of detecting information about a target object by using ultrasound waves, according to an exemplary embodiment.

FIG. 4 is a flowchart of a method of detecting information about the target (130 of FIG. 3) object by using ultrasound waves, according to an exemplary embodiment.

Referring to FIG. 4, the electronic apparatus (1 of FIG. 3) may modulate an ultrasound wave by using a predetermined code signal and emit the modulated ultrasound wave (operation 410). For example, the predetermined code signal may be a PN code, and an ultrasound wave may be amplitude modulated according to the PN code. The amplitude modulated ultrasound wave may be emitted to the outside of the electronic apparatus, for detection of information about the target object 130.

The electronic apparatus 1 may receive an echo signal corresponding to the ultrasound wave emitted in operation 410 and then reflected from the target object 130 (operation 420)

The electronic apparatus 1 may acquire a reception signal from the echo signal received in operation 420 (operation 430). According to an exemplary embodiment, the reception signal may be acquired by demodulating the received echo signal.

The electronic apparatus 1 may calculate a difference between correlation values corresponding to a plurality of predetermined periods of the reception signal acquired in operation 430 and the predetermined code signal (operation 440). For example, the electronic apparatus 1 may calculate a difference between correlation values respectively corresponding to the predetermined period and its subsequent period.

The electronic apparatus 1 may detect information about the target object 130 based on the difference calculated in operation 440 (operation 450). For example, the electronic apparatus 1 may determine whether the target object 130 is within a predetermined distance from the electronic apparatus 1 based on whether the difference exceeds a predetermined threshold and output a result of the determining as information about the target object 130.

According to an exemplary embodiment, the electronic apparatus 1 is capable of determining the presence or absence of the moving target object 130 with high precision even when a reflected signal has a low intensity by using a difference between correlation values corresponding to a plurality of predetermined periods, which is not affected by the intensity of a reflected signal.

Figure 5:
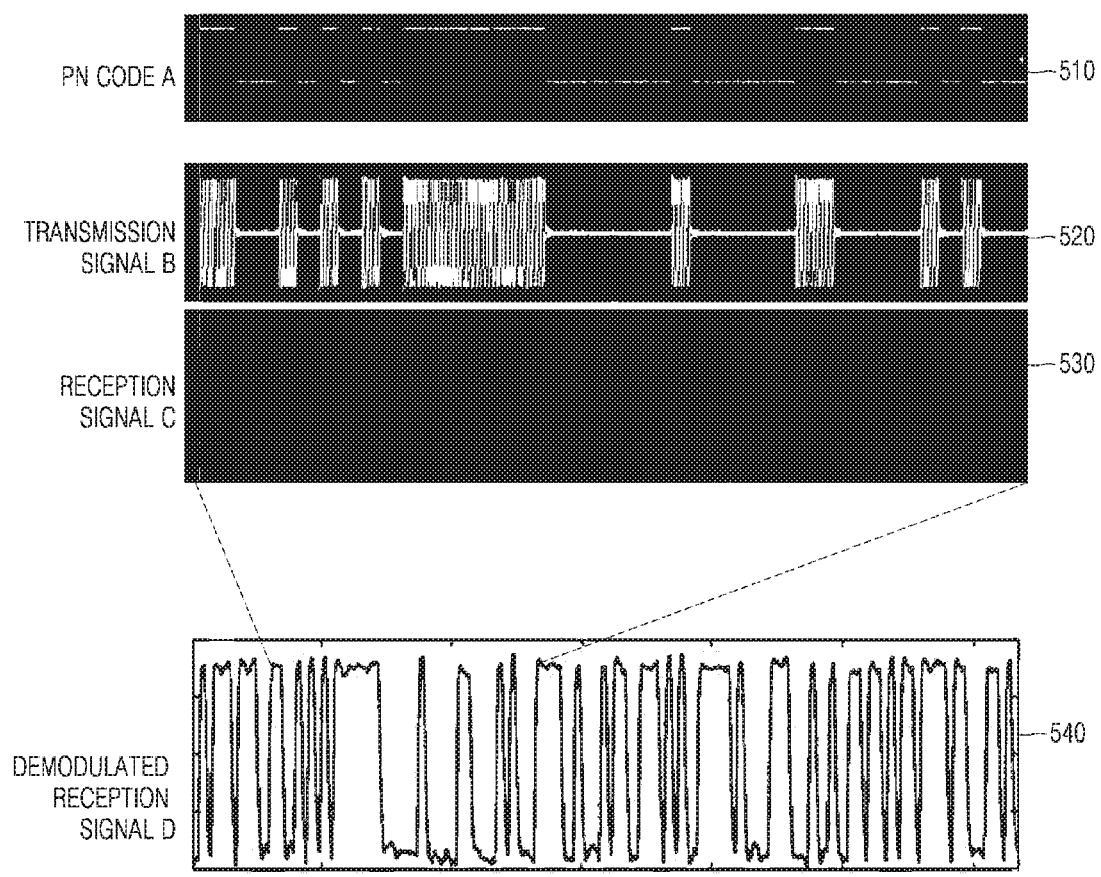
FIG. 5 is an example of signals processed by an electronic apparatus, according to an exemplary embodiment.

FIG. 5 is an example of signals processed by an electronic apparatus, according to an exemplary embodiment.

FIG. 5 shows graphs 510, 520, 530, and 540 of a PN code A, a transmission signal B, a reception signal C, and a demodulated reception signal D, respectively.

The PN code A shown on graph 510 is a code generated by the PN code generator (11 of FIG. 3) and may have a value of 0 or 1.

The transmission signal B shown on graph 520 is obtained by performing AM on a carrier signal by using the PN code A. An ultrasound signal may be output by converting the transmission signal B.

The reception signal C shown on graph 530 is obtained by amplifying a reflected signal. Unlike the transmission signal B, the reception signal C may have a slightly gentle waveform as it loses a part of energy in an external environment.

The demodulated reception signal D shown on graph 540 is obtained by performing AM on the reception signal C. Information about the target object 130 may be detected by using a correlation value between the demodulated reception signal D and the PN code A. According to an exemplary embodiment, the information about the target object 130 may be detected based on a difference between correlation values corresponding to a plurality of predetermined periods of the demodulated reception signal D and the PN code A.

As seen on graph 540, the demodulated reception signal D is affected little by noise since an object is located at a short distance so a strong reflected signal is received. However, a large number of demodulated reception signals D are hard to distinguish from one another due to severe noise when an object is located at a long distance or an obstacle is present.

However, according to an exemplary embodiment, since the presence or absence of the target object 130 is determined based on a difference between correlation values instead of a correlation value itself between the demodulated reception signal D and the PN code A, the effects of noise may be minimized.

Figure 6:
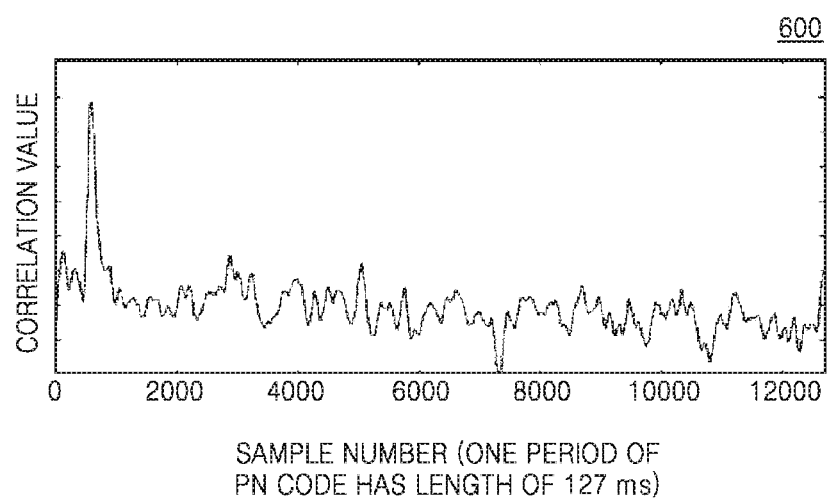
FIG. 6 is an example of a correlation value according to an exemplary embodiment.

FIG. 6 is an example of a correlation value according to an exemplary embodiment.

In a graph 600 of FIG. 6, the ordinate and abscissa respectively denote a correlation value Corr(i) and a sample number (NPN is the number of samples) for each time period TPN corresponding to one period of PN code A.

In the example shown in FIG. 6, when calculating a correlation value for the PN code A having a period of 127 bits at a frequency of 1 kHz, the electronic apparatus 1 may calculate a correlation value at time intervals 0.01 ms if a sample frequency for calculating a correlation value is 100 kHz. Thus, a total of 12,700 correlation values may be obtained during one-frame interval of 127 ms.

Referring to FIG. 6, a correlation value reaches a maximum value at a time interval with a small sample number. At a sample number in which the correlation value reaches the maximum value, the demodulated reception signal D and the PN code A are highly correlated with each other.

If an ultrasound wave reflected by a non-moving object is received, the reflected ultrasound wave remains unchanged, and thus the same correlation value is repeatedly obtained for each frame. Otherwise, if the moving target object 130 such as a human body is present, a correlation value may vary per frame.

Thus, according to exemplary embodiments, the electronic apparatus 1 may calculate a difference between correlation values corresponding to a plurality of temporally consecutive frames and determine whether the target object 130 is located within a predetermined distance from the electronic apparatus 1 based on the calculated difference.

Figure 7:
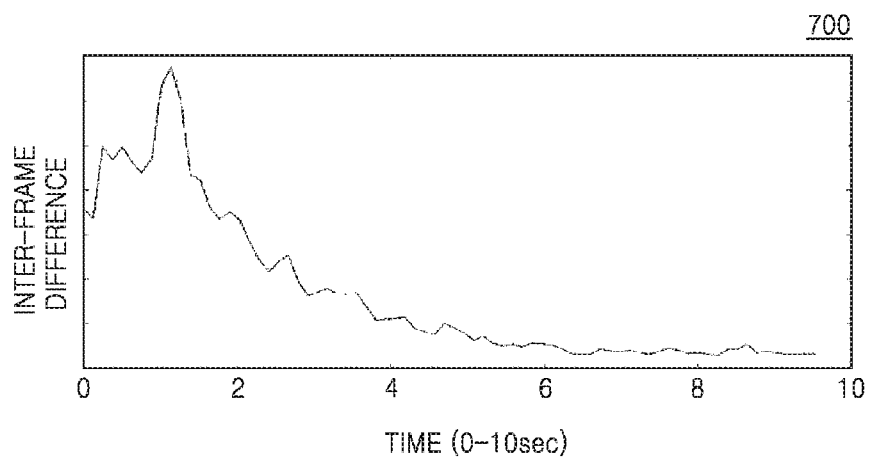
FIG. 7 illustrates an example of a difference between correlation values corresponding to a plurality of frames (hereinafter, referred to as an "inter-frame difference between correlation values") according to an exemplary embodiment.

FIG. 7 illustrates an example of a difference between correlation values corresponding to a plurality of frames according to an exemplary embodiment.

In a graph 700 of FIG. 7, the abscissa and ordinate respectively denote the time (0 to 10 s) and an inter-frame difference between correlation values that can be calculated by the difference calculator (33 of FIG. 3).

As seen on FIG. 7, the inter-frame difference between correlation values begin to increase immediately after reception of a reflected signal by the electronic apparatus 1 but gradually decreases after the inter-frame difference reaches its peak upon a lapse of about 1 second from the reception.

Figure 8:
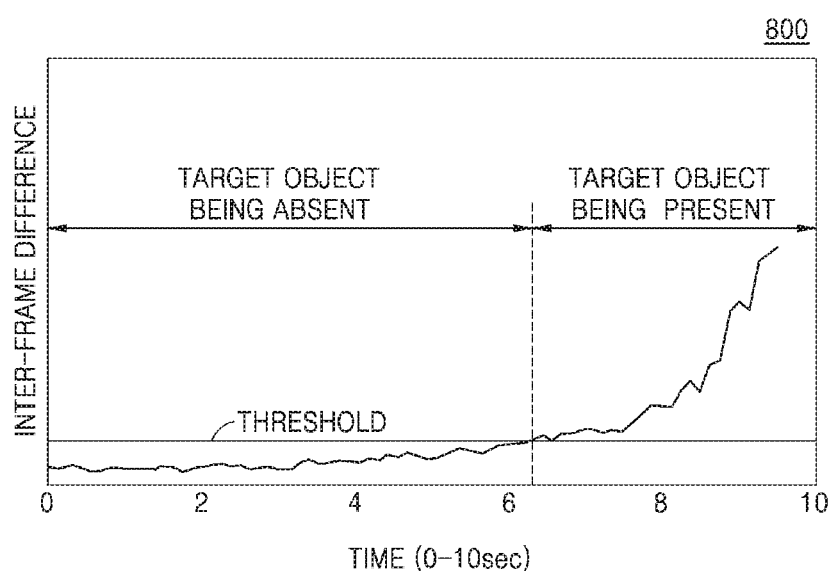
FIG. 8 illustrates an example of a result of determining the presence/absence of a target object according to an exemplary embodiment.

FIG. 8 illustrates an example of a result of determining the presence/absence of the target object 130 according to an exemplary embodiment.

In a graph 800 of FIG. 8, the ordinate and abscissa respectively denote an inter-frame difference (FrameDifference(i)) between correlation values and the time.

Referring to FIG. 8, the inter-frame difference exceeds a threshold at around six (6) seconds. The target object detector (34 of FIG. 3) may determine that the target object 130 is "absent" up to around 6 seconds and that the target object 130 is "present" during an interval between 6 and 10 seconds. The target object 130 being "absent" may represent a case in which the target object 130 is not located within a predetermined distance from the electronic apparatus 1. The target object 130 being "present" may represent a case in which the target object 130 is located within the predetermined distance from the electronic apparatus 1.

The target object detector 34 may detect the target object 130 with high sensitivity by using a difference between correlation values corresponding to temporally consecutive frames.

According to an exemplary embodiment, the electronic apparatus 1 may calculate a correlation value Corr(i) between PN code A and demodulated reception signal D that is obtained by demodulating a reception signal reflected from the target object 130. The electronic apparatus 1 may determine whether the target object 130 is located within a predetermined distance from the electronic apparatus 1 based on a difference between correlation values corresponding to temporally consecutive frames.

For example, the electronic apparatus 1 may set a repetition period of PN code A to be one frame for a correlation value Corr(i) and calculate a difference FrameDifference(i) between correlation values corresponding to two temporally consecutive frames. Then, when the difference FrameDifference(i) exceeds a predetermined threshold, the electronic apparatus 1 may determine that the target object 130 is located within a predetermined distance from the electronic apparatus 1.

Thus, according to exemplary embodiments, even when a reflected signal has a low intensity or other stationary non-target object is located near the electronic apparatus 1, the electronic apparatus 1 is able to detect the presence or absence of the target object 130 with high precision by using a difference between correlation values corresponding to two temporally consecutive frames.

Figure 9:
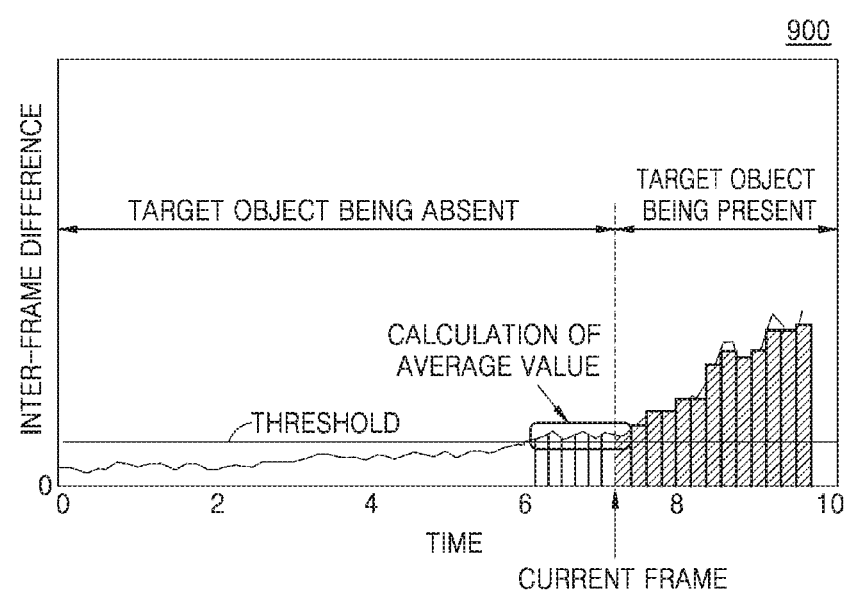
FIG. 9 illustrates an example of a result of determining the presence or absence of a target object based on an average value of inter-frame differences between correlation values, according to an exemplary embodiment.

FIG. 9 illustrates an example of a result of determining the presence or absence of the target object 130 based on an average value of inter-frame differences between correlation values, according to an exemplary embodiment.

If the target object 130 moves and stops repeatedly so that an inter-frame difference between correlation values exceeds or falls below a threshold, the electronic apparatus 1 may fail to properly determine the presence or absence of the target object 130 despite the existence of the target object 130. Thus, the target object detector 34 may calculate an average value of differences between correlation values corresponding to a plurality of current and previous frames and determine the presence or absence of the target object 130 by comparing the average value with the threshold. A method of detecting the target object 130 by using an average value of an inter-frame difference between correlation values allows stable, accurate detection of the target object 130.

As in the example shown on a graph 900 of FIG. 9, the target object detector 34 may determine that the target object 130 is present in a current frame by using an average value of differences between correlation values corresponding to a total of seven (7) frames including the current frame and six (6) previous frames. Although FIG. 9 shows the example of using an average value of differences for the 7 frames, the target object detector 34 may achieve the same effect as that obtained when an average value of differences for 7 frames is used by suppressing an instantaneous variation of the differences by using a digital filter (e.g., an LPF).

Figure 10:
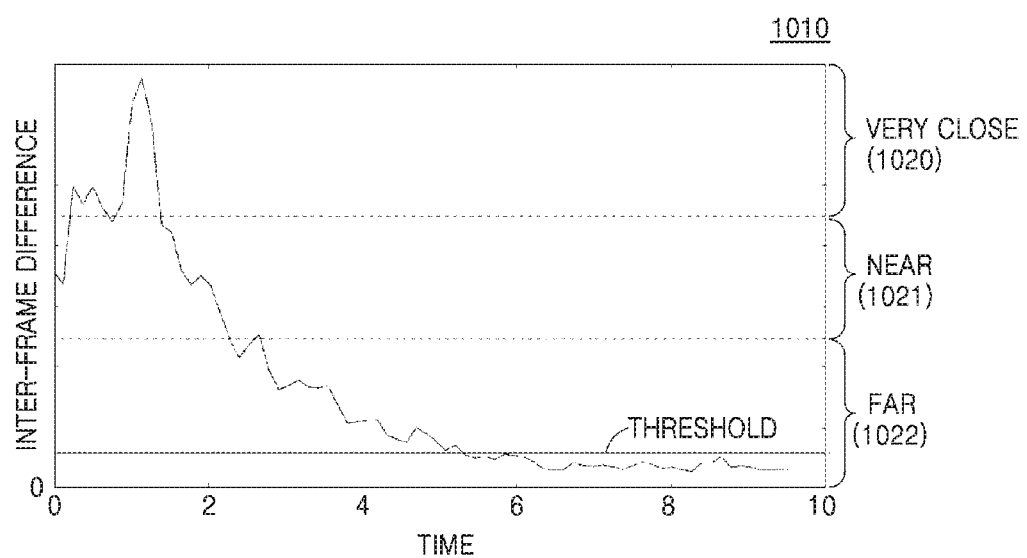
FIG. 10 is an exemplary diagram for explaining a method of obtaining a position of a target object based on an inter-frame difference between correlation values, according to an exemplary embodiment.

FIG. 10 is an exemplary diagram for explaining a method of obtaining a position of the target object 130 based on an inter-frame difference between correlation values, according to an embodiment.

According to an exemplary embodiment, the electronic apparatus 1 may not only determine the presence or absence of the target object 130 but also estimate a distance from the electronic apparatus 1 to the target object 130 based on an inter-frame difference between correlation values.

For example, if the same target object 130 moves, both a reflected signal and a correlation value may fluctuate to a larger extent as the target object 130 becomes closer to the electronic apparatus 1. Thus, an inter-frame difference between correlation values may increase accordingly.

Thus, when an inter-frame difference between correlation values exceeds a threshold so that the target object detector 34 may detect the target object 130, the electronic apparatus 1 may respectively correspond predetermined magnitudes of inter-frame differences between correlation values to predetermined distances to the target object 130 and estimate a distance between the electronic apparatus 1 and the target object 130 from a magnitude of a current inter-frame difference between correlation values.

As seen on a graph 1010 of FIG. 10, inter-frame differences between correlation values may respectively correspond to distances between the electronic apparatus 1 and the target object 130 as positions of the target object 130 according to their magnitude. For example, the electronic apparatus 1 may estimate a distance to the target object 130 as being very close 1020, near 1021, and far 1022 based on a magnitude of an inter-frame difference between correlation values. Thus, according to exemplary embodiments, it is possible to estimate a distance from the electronic apparatus 1 to the target object 130 simply and conveniently.

Figure 11:
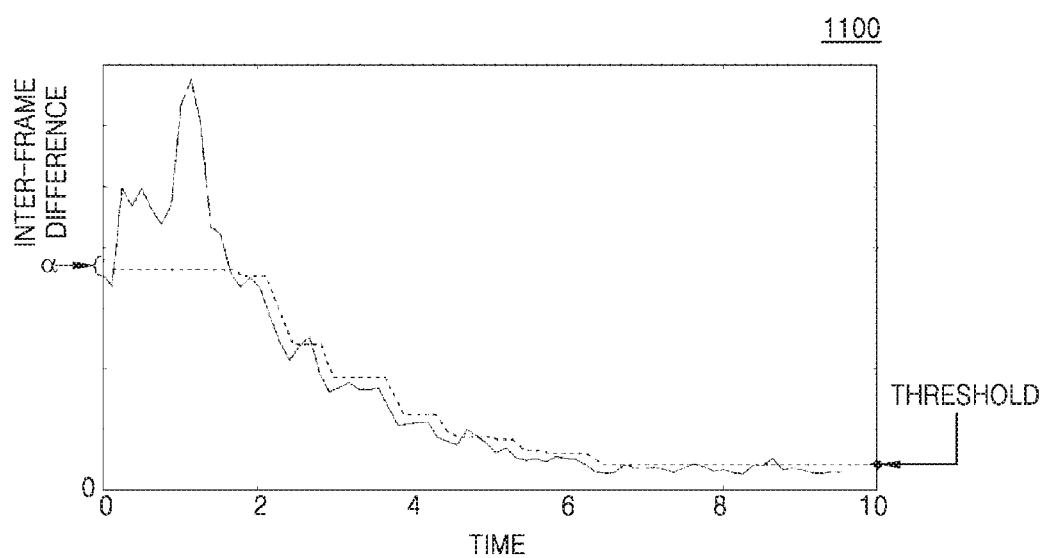
FIG. 11 is an exemplary diagram for explaining a method of determining a threshold for an inter-frame difference between correlation values, according to an exemplary embodiment.

FIG. 11 is an exemplary diagram for explaining a method of determining a threshold for an inter-frame difference between correlation values, according to an exemplary embodiment.

According to an exemplary embodiment, the electronic apparatus 1 may determine a threshold for determining the presence or absence of the target object 130 by using a calibration method. According to the calibration method, a threshold may be automatically set for each predetermined time period according to an inter-frame difference between correlation values.

For example, the electronic apparatus 1 may predefine a calibration time T and a detection degree adjustment value α and set "a minimum value of inter-frame differences within the calibration time T plus the detection degree adjustment value α" as a threshold.

$$\text{threshold} = \min \text{FrameDifference} + \alpha \quad (4)$$

Referring to a graph 1100 of FIG. 11, as an inter-frame difference between correlation values gradually decreases, the threshold may be set to a value close to zero (0) at a calibration termination time point (T=10 seconds).

By using the calibration method, the electronic apparatus 1 may automatically set a threshold according to an inter-frame difference between correlation values in a simple and convenient way.

Figure 12:
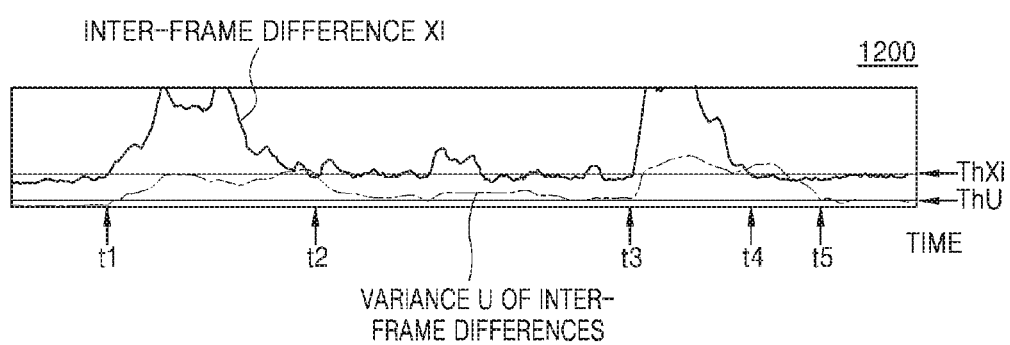
FIG. 12 illustrates an example of an inter-frame difference $X_i$ between correlation values and a variance $U$ of inter-frame differences $X_i$.

FIG. 12 illustrates an example of an inter-frame difference Xi between correlation values and a variance U of inter-frame differences Xi between correlation values.

In a graph 1200, the abscissa and ordinate respectively represent the time and an inter-frame difference Xi between correlation values or a variance U of inter-frame differences Xi.

FIG. 12 shows an example of an inter-frame difference Xi between correlation values and a variance U of inter-frame differences Xi therebetween, which are obtained by the electronic apparatus 1 when the target object 130 moves to be within a predetermined distance from the electronic apparatus 1 (during a time interval between t1 and t2), moves slightly or ceases to move (during a time interval between t2 an t3) and eventually moves out of the predetermined distance (during a time interval between t3 and t4).

According to an exemplary embodiment, the electronic apparatus 1 may determine whether the target object 130 is located within a predetermined distance from the electronic apparatus 1 based on the amount of a variation (e.g., a variance) of inter-frame differences between correlation values corresponding to consecutive frames during a predetermined time interval.

The difference calculator 33 of the electronic apparatus 1 may calculate an inter-frame difference FrameDifference(i) (or an "inter-frame difference Xi") between correlation values corresponding to two temporally consecutive frames from correlation values. The difference calculator 33 may also calculate an average value of inter-frame differences Xi during an interval of N seconds (N is an integer greater than or equal to 1) by using Equation (5) below:

$$\overline{X} \quad (5)$$

Furthermore, the difference calculator 33 may calculate a variance U of the inter-frame differences Xi during the interval of N seconds by using the number n of frames according to Equation (6) below:

$$U = \frac{\sum_{i=1}^{n}(X_i - \overline{X})^2}{n} \quad (6)$$

The difference calculator 33 may then output the inter-frame difference Xi and the average value and variance U of the inter-frame differences Xi to the target object detector 34.

The target object detector 34 may determine whether the target object 130 is located within a predetermined distance from the electronic apparatus 1 based on at least one of a result of comparing the inter-frame difference Xi with a threshold ThXi for the inter-frame difference Xi and a result of comparing the variance U with a threshold ThU for the variance U, and output a result of the determining to the outside.

Referring to a graph 1200 of FIG. 12, since the target object 130 moves to a large extent during the time intervals between t1 and t2 and between t3 and t4, the inter-frame differences Xi greatly exceed the threshold ThXi. Thus, the target object detector 34 may determine, based on the inter-frame difference Xi, that the target object 130 is located within the predetermined distance from the electronic apparatus 1 during the time intervals between t1 and t2 and between t3 and t4.

On the other hand, since the target object 130 moves to a small extent during the time interval between t2 and t3, the inter-frame differences Xi hardly exceed the threshold ThXi. Thus, the target object detector 34 may determine that the target object 130 is not within the predetermined distance from the electronic apparatus 1 during the time interval between t2 and t3 only based on the inter-frame difference Xi without even taking the variance U into account.

As seen on FIG. 12, although a time interval between t1 and t5 includes the time interval between t2 and t3 when the target object 130 moves to a small extent, the variance U of inter-frame differences Xi exceeds the threshold ThU during the time interval between t1 and t5. Thus, the target object detector 34 may determine that the target object 130 is present during the time interval between t1 and t5 based on the variance U.

At time point t1, the electronic apparatus 1 may detect the presence of the target object 130 with high sensitivity within a short time according to an inter-frame difference Xi between correlation values. On the other hand, during the time interval between t1 and t5 that is a relatively long duration, the electronic apparatus 1 may detect the presence or absence of the target object 130 based on a variance U more accurately than when detecting the presence thereof at the time point t1.

Thus, according to exemplary embodiments, across the time interval between t1 and t5, the electronic apparatus 1 may determine the presence or absence of the target object 130 with high sensitivity, based on an inter-frame difference Xi between correlation values and variance U, and accurately, due to a relatively long analysis.

The electronic apparatus 1 cannot determine, based on a result of detecting the target object 130 according to an inter-frame difference Xi between correlation values, whether the same object has been detected twice or whether two different objects have been detected during the time intervals between t1 and t2 and between t3 and t4. However, according to exemplary embodiments, the electronic apparatus 1 may determine that the same target object 130 has been consecutively detected during the time interval between t1 and t5 by taking into account a result of detecting the target object 130 based on variance U as well as an inter-frame difference Xi.

Thus, according to exemplary embodiments, the electronic apparatus 1 may accurately detect information about the target object 130 by further taking into account a variance of inter-frame differences between correlation values together with the inter-frame differences therebetween.

Furthermore, when a camera operates based on a result of determining the presence or absence of the target object 130, the camera may operate at time point t1 when an inter-frame difference Xi between correlation values exceeds a threshold ThXi and continue to operate during the time interval between t1 and t5 when a variance U exceeds a threshold ThU even though the inter-frame difference Xi is less than the threshold ThXi. The camera may then cease to operate at time point t5 when both the inter-frame difference Xi and the variance U are respectively less than the thresholds ThXi and ThU.

Furthermore, according to an exemplary embodiment, the electronic apparatus 1 may detect information about the target object 130 by using only a variance U of inter-frame differences Xi between correlation values and not the inter-frame differences Xi therebetween.

Furthermore, according to an exemplary embodiment, the target object detector 34 of the electronic apparatus 1 may determine that the target object 130 is located within a predetermined distance from the electronic apparatus 1 when a variance U of inter-frame differences between correlation values corresponding to consecutive frames during a predetermined time interval exceeds a predetermined threshold ThU.

Figure 13:
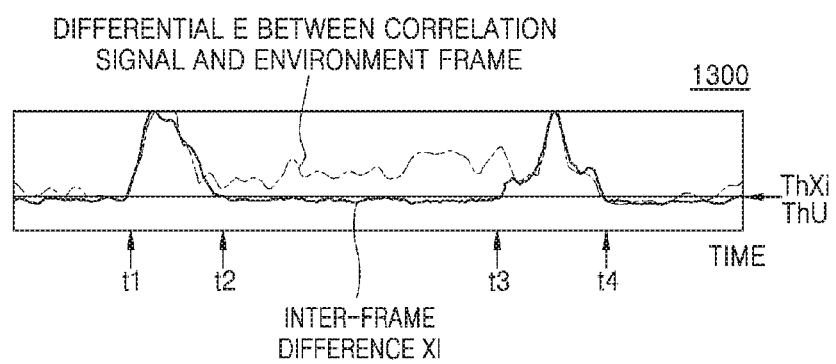
FIG. 13 illustrates an example of an inter-frame difference Xi between correlation values and an environment frame differential E, according to an exemplary embodiment.

FIG. 13 illustrates an example of an inter-frame difference Xi between correlation values and an environment frame differential E, according to an exemplary embodiment.

According to an exemplary embodiment, the electronic apparatus 1 may determine the presence or absence of the target object 130 based on a correlation value obtained in the absence of the target object 130 and a correlation value for detecting information about the target object 130.

According to an exemplary embodiment, the electronic apparatus 1 may determine, based on information about the target object 130, a time interval during which the target object 130 is not located within a predetermined distance from the electronic apparatus 1. The electronic apparatus 1 may also detect correlation values corresponding to the determined time interval as an environment frame and detect information about the target object 130 by using the detected environment frame. For example, the electronic apparatus 1 may calculate a differential by subtracting an environment frame from a correlation value corresponding to a predetermined time interval and detect information about the target object 130 based on a difference between differentials respectively corresponding to a plurality of predetermined periods during the predetermined time interval.

According to an exemplary embodiment, the difference calculator 33 of the electronic apparatus 1 may calculate a difference between correlation values corresponding to a plurality of predetermined periods. For example, the difference calculator 33 may calculate a difference Xi between correlation values corresponding to two temporally consecutive frames. Furthermore, the difference calculator 33 may calculate an environment frame differential E by using correlation values corresponding to a time interval during which it is not determined that the target object 130 is present and output the environment frame differential E to the target object detector 34. The difference calculator 33 may set as an "environment frame" correlation values corresponding to an interval of one period of a PN code among the correlation values corresponding to the time interval. The difference calculator 33 may also obtain a differential between the environment frame and a correlation value corresponding to a current frame as an environment frame differential E.

The target object detector 34 may determine the presence or absence of the target object 130 based on at least one of a result of comparing an inter-frame difference Xi between correlation values with a threshold ThXi and a result of comparing an environment frame differential E with a predetermined threshold ThE.

In a graph 1300 of FIG. 13, the abscissa and ordinate respectively represent the time and a magnitude of an inter-frame difference Xi or environment frame differential E.

FIG. 13 shows an example of an inter-frame difference Xi between correlation values and an environment frame differential E, which are obtained by the electronic apparatus 1 when the target object 130 moves to be within a predetermined distance from the electronic apparatus 1 (during a time interval between t1 and t2), moves slightly or ceases to move (during a time interval between t2 an t3) and eventually moves out of the predetermined distance (during a time interval between t3 and t4).

The target object detector 34 may determine, based on the inter-frame difference Xi, that the target object 130 is located within a predetermined distance from the electronic apparatus 1 during the time intervals between t1 and t2 and between t3 and t4 and that the target object 130 is not located within the predetermined distance during the time interval between t2 and t3.

However, since the environment frame differential E exceeds the threshold ThE during a time interval between t1 and t4, the target object detector 34 may determine, based on the environment frame differential E, that the target object 130 is located within the predetermined distance from the electronic apparatus 1 during the time interval between t1 and t4.

According to an exemplary embodiment, the electronic apparatus 1 may detect the presence of the target object 130 within a short time and with high sensitivity at time point 11 based on the inter-frame difference Xi, and accurately based on the environment frame differential E during the time interval between t1 and t4. Furthermore, the electronic apparatus 1 may detect the presence or absence of the target object 130 within a short time and with high sensitivity at time point t4 based on both the inter-frame difference Xi and the environment frame differential E.

The electronic apparatus 1 may determine that the target object 130 is located within the predetermined distance from the electronic apparatus 1 by taking into account a result of detecting the presence or absence of the target object 130 during the time interval between t1 and t4 based on the environment frame differential E, together with a result of detecting the presence or absence of the target object 130 during the time intervals between t1 and t2 and between t3 and t4 based on the inter-frame difference Xi.

Furthermore, according to an exemplary embodiment, when a camera operates based on a result of determination by the electronic apparatus 1, the camera may operate at time point t1 when an inter-frame difference Xi exceeds a threshold ThXi and cease to operate at time point t4 when both the inter-frame difference Xi and environmental frame differential E are respectively less than the thresholds ThXi and ThE.

According to an exemplary embodiment, the environment frame may be an average value of a plurality of correlation values corresponding to a plurality of intervals during which it is not determined that the target objet 130 is within the predetermined distance from the electronic apparatus 1.

Furthermore, according to an exemplary embodiment, the electronic apparatus 1 may detect the presence of the target object 130 by using only the environment frame differential E and not the inter-frame difference Xi.

Figure 14:
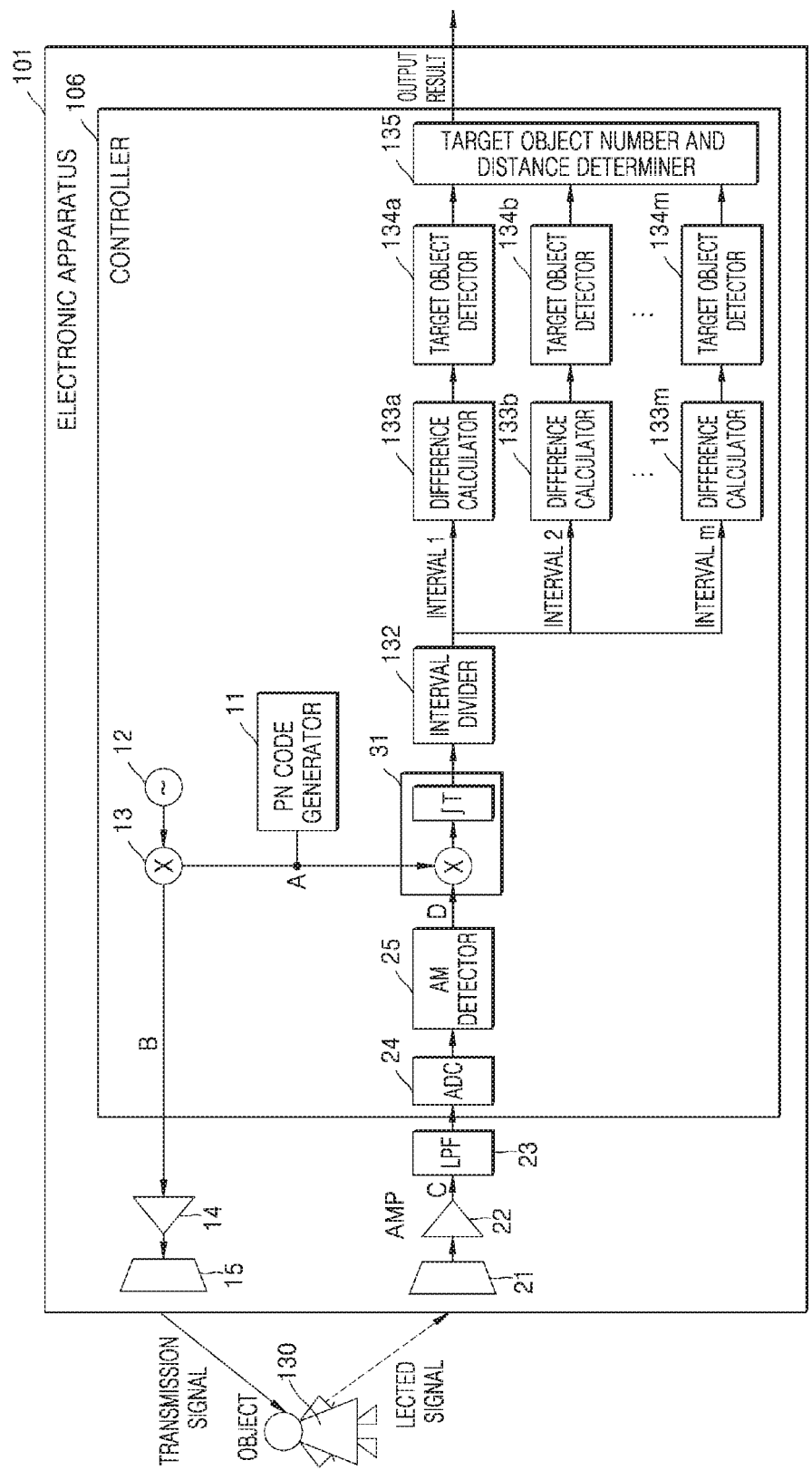
FIG. 14 is a block diagram of a configuration of an electronic apparatus according to another exemplary embodiment.

FIG. 14 is a block diagram of a configuration of an electronic apparatus 101 according to another exemplary embodiment;

Unlike the electronic apparatus 1 of FIG. 3, the electronic apparatus 101 of FIG. 14 may divide correlation values into a plurality of time intervals. For example, the electronic apparatus 101 may divide one frame period of correlation values into a plurality of time intervals. The one frame period of correlation values may be equal to one period of a predetermined code signal.

According to an exemplary embodiment, the electronic apparatus 101 may partition a predetermined period into a plurality of time intervals and detect at least one of the number of target objects 130 and information about a position of the target object 130 in each of the plurality of time intervals based on a difference between correlation values corresponding to a plurality of predetermined periods.

The electronic apparatus 101 may respectively associate the plurality of time intervals to distances between the electronic apparatus 101 and the target object 130. As each of the plurality of time intervals becomes finer, a distance range corresponding to each time interval becomes narrower. Thus, as the partition of time intervals becomes finer, position information of the target object detected by the electronic apparatus 101 may become more accurate.

Furthermore, the electronic apparatus 101 may determine the presence or absence of the target object 130 by calculating a difference between correlation values corresponding to two consecutive frames for each time interval instead of a difference between correlation values corresponding to a plurality of consecutive frames.

Referring to FIG. 14, the electronic apparatus 101 may include a PN code generator 11, a carrier signal generator 12, a mixer 13, a driver circuit 14, an ultrasonic transmitter 15, an ultrasonic receiver 21, an amplifier 22, an LPF 23, an ADC 24, an AM detector 25, and a correlation value calculator 31 respectively corresponding to their counterparts included in the electronic apparatus 1 of FIG. 3. The electronic apparatus 101 may further include an interval divider 132, a plurality of difference calculators 133a through 133m, a plurality of target object detectors 134a through 134m, and a target object number and distance determiner 135.

Descriptions of components of the electronic apparatus 101 corresponding to their counterparts in the electronic apparatus 1 of FIG. 3 will not be repeated below.

The correlation value calculator 31 may calculate correlation values between a demodulated reception signal D obtained after performing AM and a PN code A and output the correlation values to the interval divider 132.

The interval divider 132 may divide the correlation values into a plurality of time intervals and output correlation values for the time intervals to the difference calculators 133a through 133m respectively corresponding to the time intervals.

Each of the difference calculators 133a through 133m calculates an inter-frame difference between correlation values for each of the time intervals and outputs the inter-frame difference to a corresponding one of the target object detectors 134a through 134m.

For each time interval, when an inter-frame difference between correlation values exceeds a detection threshold, a corresponding one of the target object detectors 134a through 134m may determine the presence or absence of the target object 130 and output a result of the determining to the target object number and distance determiner 135.

The target object number and distance determiner 135 may determine at least one of a distance to the target object 130 and the number of target objects 130 based on the time interval and time during which the corresponding one of the target object detectors 134a through 134m determines that the target object 130 has been detected. The distance to the target object 130 may be determined according to Equation (7) as will be described below. The number of target objects 130 may be determined when the target objects 130 at different positions are detected at the same time point. Thus, according to exemplary embodiments, the electronic apparatus 101 is able to simultaneously detect a plurality of target objects 130 that are at difference distances from the electronic apparatus 101.

According to an exemplary embodiment, each of the difference calculators 133a through 133m may calculate a difference between correlation values corresponding to two temporally consecutive frames, and when the difference exceeds a detection threshold, a corresponding one of the target object detectors 134a through 134m may determine that the target object 130 is located within a predetermined distance from the electronic apparatus 101.

Figure 15:
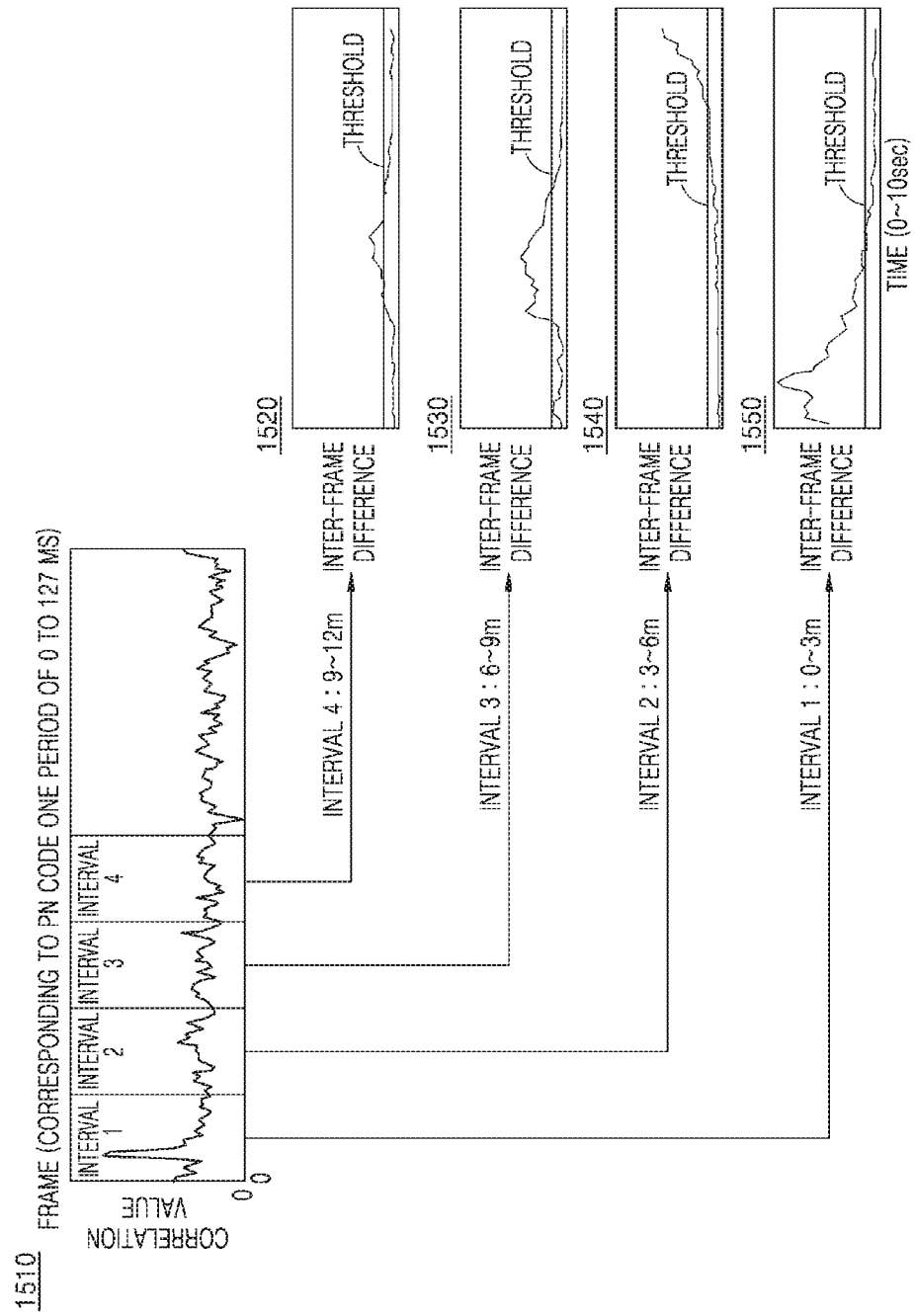
FIG. 15 illustrates an example of an inter-frame difference between correlation values for each of a plurality of time intervals obtained by dividing a correlation value, according to an exemplary embodiment.

FIG. 15 illustrates an example of an inter-frame difference between correlation values for each of a plurality of time intervals obtained by dividing correlation values, according to an exemplary embodiment.

Referring to a graph 1510 of FIG. 15, the interval divider 132 may divide correlation values corresponding to a front part of one frame into four (4) time intervals (intervals 1 through 4). According to an exemplary embodiment, the intervals 1 through 4 may respectively correspond to distances 0 to 3 m, 3 to 6 m, 6 to 9 m, and 9 to 12 m between the electronic apparatus 101 and the target object 130, as defined in Equation (7) below. For each of the intervals, a distance D 1 through 4 may be calculated by using a time period TPN and a sampling period NPN of the PN code A, a sound velocity Vs, and a sample position Pi where a maximum distance to the target object 130 is detected, according to Equation (7):

$$D = \frac{1}{2} T_{PN} \cdot \frac{p_i}{N_{PN}} \cdot v_s \qquad (7)$$

Referring to a graph 1550 of FIG. 15, the target object number and distance determiner 135 may determine that at least one person is located at a distance 0 to 3 m at around 1 second. Furthermore, referring to graphs 1520 and 1530 of FIG. 15, the target object number and distance determiner 135 may determine that at least one person is respectively located at distances 6 to 9 m and 9 to 12 m at around 4 seconds. Referring to a graph 1540 of FIG. 15, the target object number and distance determiner 135 may determine that at least one person is located at a distances 3 to 6 m at around 9 seconds.

Figure 16:
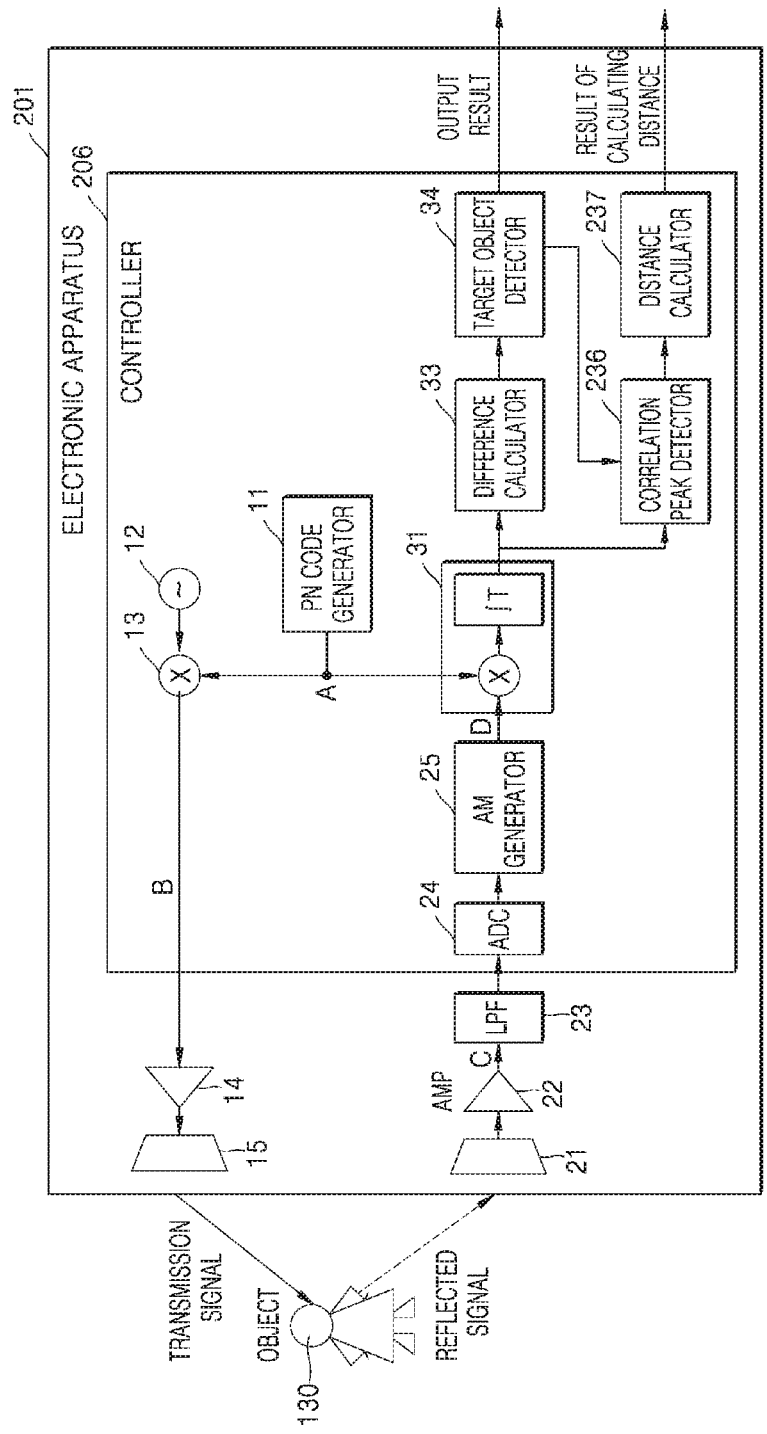
FIG. 16 is a block diagram of a configuration of an electronic apparatus according to another exemplary embodiment.

FIG. 16 is a block diagram of a configuration of an electronic apparatus 201 according to another embodiment.

The electronic apparatus 201 according to the present exemplary embodiment may determine a time interval during which a target object 130 is located within a predetermined distance from the electronic apparatus 201, based on information about the target object 130 obtained based on a difference between correlation values. The information about the target object 130 may contain information about whether the target object 130 is located within the predetermined distance from the electronic apparatus 201. The electronic apparatus 201 may find a maximum correlation value in the determined time interval and more accurately detect position information of the target object 130 based on a time point when the maximum correlation value is detected.

Unlike the electronic apparatus 1 of FIG. 3, the electronic apparatus 201 of FIG. 16 may further include a correlation peak detector 236 and a distance calculator 237. Thus, in a time interval in which the target object 130 is detected, the electronic apparatus 201 may obtain a position of the target object 130 with respect to the electronic apparatus 201 according to a correlation peak that is the maximum correlation value.

Since a PN code generator 11, a carrier signal generator 12, a mixer 13, a driver circuit 14, an ultrasonic transmitter 15, an ultrasonic receiver 21, an amplifier 22, an LPF 23, an ADC 24, an AM detector 25, and a correlation value calculator 31 included in the electronic apparatus 201 of FIG. 16 respectively correspond to their counterparts included in the electronic apparatus 1 of FIG. 3, descriptions thereof will not be repeated below.

The correlation value calculator 31 may calculate correlation values between a demodulated reception signal D obtained after performing AM and a PN code A and output the correlation values to a difference calculator 33 and the correlation peak detector 236.

The difference calculator 33 may calculate an inter-frame difference between correlation values corresponding to two temporally consecutive frames and output the inter-frame difference to the target object detector 34.

The target object detector 34 may determine that the target object 130 has been detected for a time interval in which the inter-frame difference exceeds a threshold. The target object detector 34 may output a result of the determining to the outside of the apparatus and to the correlation peak detector 236.

The correlation peak detector 236 may detect a correlation peak that is a maximum correlation value in the time interval in which the target object 130 has been detected by the target object detector 24. Information about a position of the detected correlation peak may be output to the distance calculator 237.

The distance calculator 237 may calculate a maximum distance between the target object 130 and the electronic apparatus 201 based on the correlation peak. The distance calculator 237 may calculate a distance D from the electronic apparatus 201 to the target object 130 by using a time period TPN and a sampling period NPN of the PN code A, a sound velocity Vs, and a sample position Pi where a maximum distance to the target object 130 is detected, according to the above Equation (7), and may output the calculated distance D.

Figure 17:
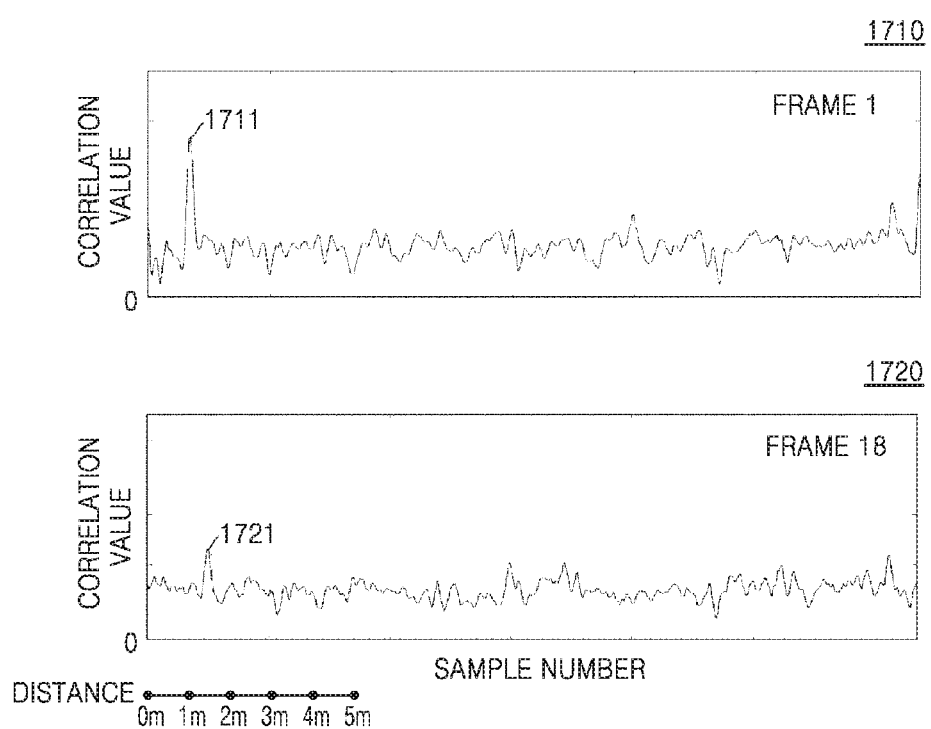
FIG. 17 is a diagram for explaining a method of obtaining a position of a target object according to an exemplary embodiment.

FIG. 17 is a diagram for explaining a method of obtaining a position of a target object according to an exemplary embodiment.

A graph 1710 of FIG. 17 illustrates a correlation value for frame 1, and a graph 1720 illustrates a correlation value for frame 18. In the graphs 1710 and 1720, the ordinate and abscissa respectively denote a correlation value and a sample number.

The distance calculator 237 may calculate a distance D from the electronic apparatus 201 to the target object 130. A distance example 1730 shows a result of precalculating a distance D according to the above Equation (7). As shown in the distance example 1730, the distance D may be determined according to a time point at which a correlation peak occurs.

Thus, referring to the graph 1710 and the distance example 1730, a distance D in frame 1 may be calculated as a value less than 1 m corresponding to a time point at which a correlation peak 1511 occurs. Furthermore, referring to the graph 1720 and the distance example 1730, a distance D in frame 18 may be calculated as a value within a range of 1 to 2 m corresponding to a time point at which a correlation peak 1721 occurs.

According to an exemplary embodiment, the electronic apparatus 201 may further include the correlation peak detector 236 for detecting a correlation peak in a time interval during which the target object 130 has been detected. Furthermore, the electronic apparatus 201 may further include the distance calculator 237 for calculating a distance between the target object 130 and the electronic apparatus 201 according to the correlation peak detected by the correlation peak detector 236.

Thus, according to exemplary embodiments, the electronic apparatus 201 described with reference to FIG. 16 may calculate a distance between the target object 130 and the electronic apparatus 201 with high precision.

Figure 18:
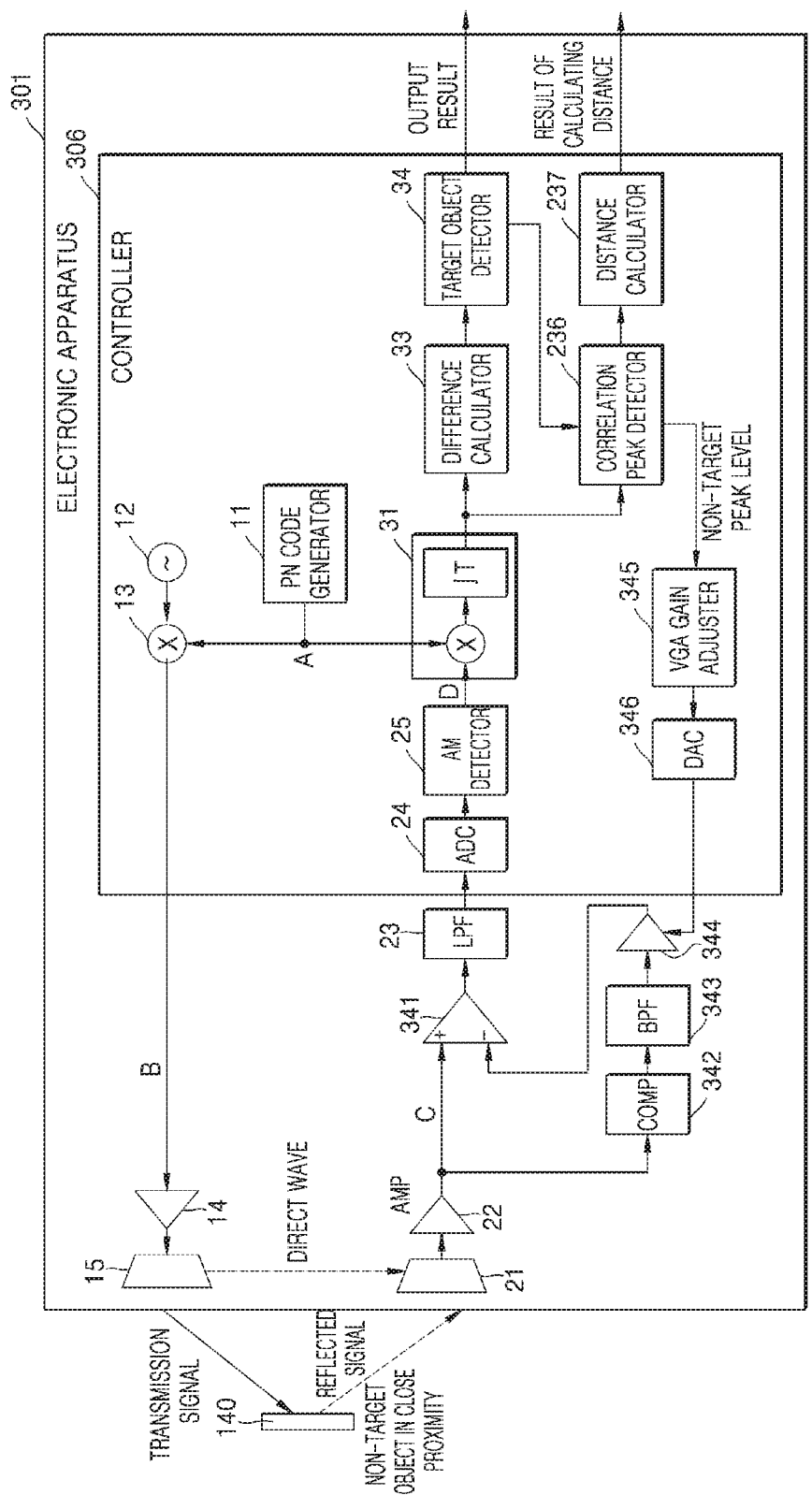
FIG. 18 is a block diagram of a configuration of an electronic apparatus according to another exemplary embodiment.

FIG. 18 is a block diagram of a configuration of an electronic apparatus 301 according to another exemplary embodiment.

The electronic apparatus 301 of FIG. 18 may perform processing for excluding effects of a direct wave propagating between a transmitter 15 and a receiver 21 and a proximity reflected wave due to a stationary non-target object 140 in close proximity to the electronic apparatus 301 and that is not to be detected. The electronic apparatus 301 is able to detect a target object and calculate a distance with greater precision by subtracting the effects of the direct wave and proximity reflected wave on an ultrasonic level of a transmission signal and delay time from a reception signal.

According to an exemplary embodiment, the electronic apparatus 301 may generate a cancellation signal by using a signal having an amplitude greater than a predetermined threshold from among signals included in the reception signal. The electronic apparatus 301 may also detect information about the target object 130 based on a signal obtained by subtracting the cancellation signal from the reception signal.

Furthermore, according to an exemplary embodiment, the electronic apparatus 301 may adjust a gain of the cancellation signal based on the detected information about the target object 130. For example, the electronic apparatus 301 may determine, based on the information about the target object 130, a time interval during which the target object 130 is not located within a predetermined distance from the electronic apparatus 301. The electronic apparatus 301 may detect a maximum correlation value in the determined time interval and adjust a gain of the cancellation signal based on the detected maximum correlation value.

The electronic apparatus 301 of FIG. 18 may include components respectively corresponding to the PN signal generator 11 and the carrier signal generator 12 included in the electronic apparatus 201 described with reference to FIG. 14. Unlike the electronic apparatus 201, the electronic apparatus 301 may further include an operational amplifier 341, a hysteresis comparator Comp 342, a band-pass filter (BPF) 343, a voltage-controlled variable gain amplifier (VGA) 344, a VGA gain adjuster 345, and a digital-to-analog converter (DAC) 346.

Since the PN code generator 11 and the carrier signal generator 12 included in the electronic apparatus 301 have substantially the same configurations and functions as those of their counterparts in the electronic apparatus 201, descriptions thereof will not be repeated below.

An amplifier 22 may amplify an electrical signal obtained by converting a received (reflected) signal and may output a reception signal C, that is the amplified electrical signal, to the operational amplifier 341 and the hysteresis comparator Comp 342.

The hysteresis comparator 342 may generate a cancellation signal from the reception signal C. According to an exemplary embodiment, the hysteresis comparator 342 may generate a cancellation signal by using a signal having an amplitude greater than a predetermined threshold from among signals included in the reception signal C.

For example, the hysteresis comparator 342 may generate a cancellation signal by separating a direct wave or proximity reflected signal having amplitude greater than a threshold from the reception signal C by using thresholds V+ and V−. Since a direct wave or proximity reflected signal is reflected or output at a point that is closer to the electronic apparatus 301 than from the target object 130, it may have an amplitude greater than a signal reflected from the target object 130. Thus, absolute values of the thresholds V+ and V− may be set to be greater than an amplitude of the reflected signal but less than that of the direct wave or proximity reflected signal. The hysteresis comparator 340 may generate a cancellation signal carrying phase (delay) information from the direct wave or proximity reflected signal separated by using the thresholds V+ and V− and may output the cancellation signal to the BPF 343.

The BPF 343 may limit the cancellation signal to the same frequency band as that of an ultrasound wave emitted by the transmitter 15 and an echo signal received by the receiver 21 and may output a band-limited cancellation signal to the voltage-controlled VGA 344.

The voltage-controlled VGA 34 adjusts a level of the band-limited cancellation signal and outputs a cancellation signal, with an adjusted level, to the operational amplifier 341.

The operational amplifier 341 may remove a direct wave or proximity reflected signal from the reception signal C by subtracting the cancellation signal with the adjusted level from the reception signal C. A level of a peak produced by the direct wave or proximity reflected signal included in the reception signal C (hereinafter, referred to as a "non-target peak") may be reduced by the operational amplifier 341.

A correlation peak detector 236 may detect a correlation peak that is greater than a predetermined threshold in a time interval (sample number) of each frame of a correlation value, corresponding to a predetermined distance range (e.g., less than 0.5 m). For example, the predetermined distance range may be preset to a distance range within which the target object 130 is most likely to be absent or be set according to a user input. The correlation peak detector 236 may detect a correlation peak as a non-target peak and output a position and a magnitude of the non-target peak to the VGA gain controller 345.

The VGA gain adjuster 345 may adjust a gain of the voltage-controlled VGA 344 so that the magnitude of the non-target peak detected by the correlation peak detector 236 decreases. The VGA gain adjuster 345 may adjust, based on the position and the magnitude of the non-target peak, the gain of the voltage-controlled VGA 344 so that the magnitude of the non-target peak decreases.

Figure 19:
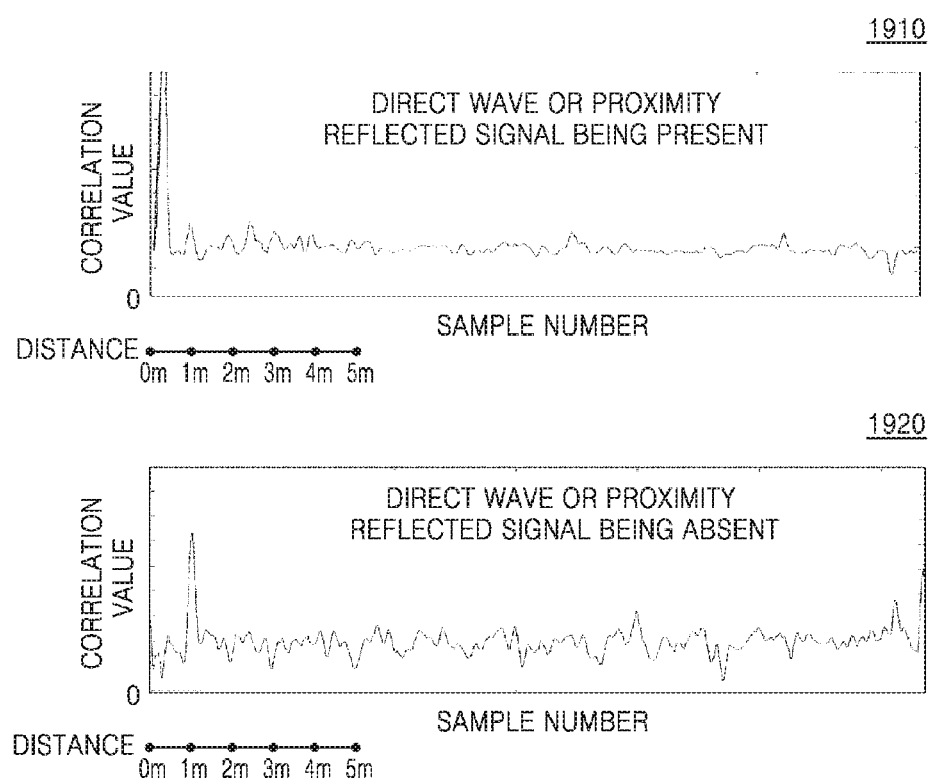
FIG. 19 illustrates an example of obtaining a correlation value by using a cancellation signal according to an exemplary embodiment.

FIG. 19 illustrates an example of obtaining a correlation value by using a cancellation signal according to an exemplary embodiment.

A graph 1910 of FIG. 19 illustrates a correlation value obtained without using a cancellation signal while a graph 1920 illustrates a correlation value obtained by using a cancellation signal.

Referring to the graph 1910 of FIG. 19, a non-target peak that is a correlation peak produced due to a non-target object that is not to be detected appears, and an analog circuit and an ADC 24 are saturated by the non-target peak. Thus, it is difficult to observe a correlation peak for the target object 130.

Referring to the graph 1920 of FIG. 19, since a component produced due to non-target object that is not to be detected is removed using a cancellation signal, a correlation peak for the target object 130 may be clearly observed. Thus, according to an exemplary embodiment, by using a cancellation signal, the electronic apparatus 301 may enhance the precision of detection of the target object 130 and determination of a distance between the target object 130 and the electronic apparatus 301 based on a phase difference in a peak position (delay time Δt).

According to an exemplary embodiment, the electronic apparatus 301 may also be constructed by an ultrasonic transceiver and a device for cancelling out a direct wave or proximity reflected signal in a radio wave or light ray other than an ultrasound wave.

According to an exemplary embodiment, the electronic apparatus 301 is configured to further include the hysteresis comparator 342, the correlation peak detector 236, and the operational amplifier 341, thereby excluding effects of a direct wave or proximity reflected signal and detecting the target object 130 with high precision.

Figure 20:
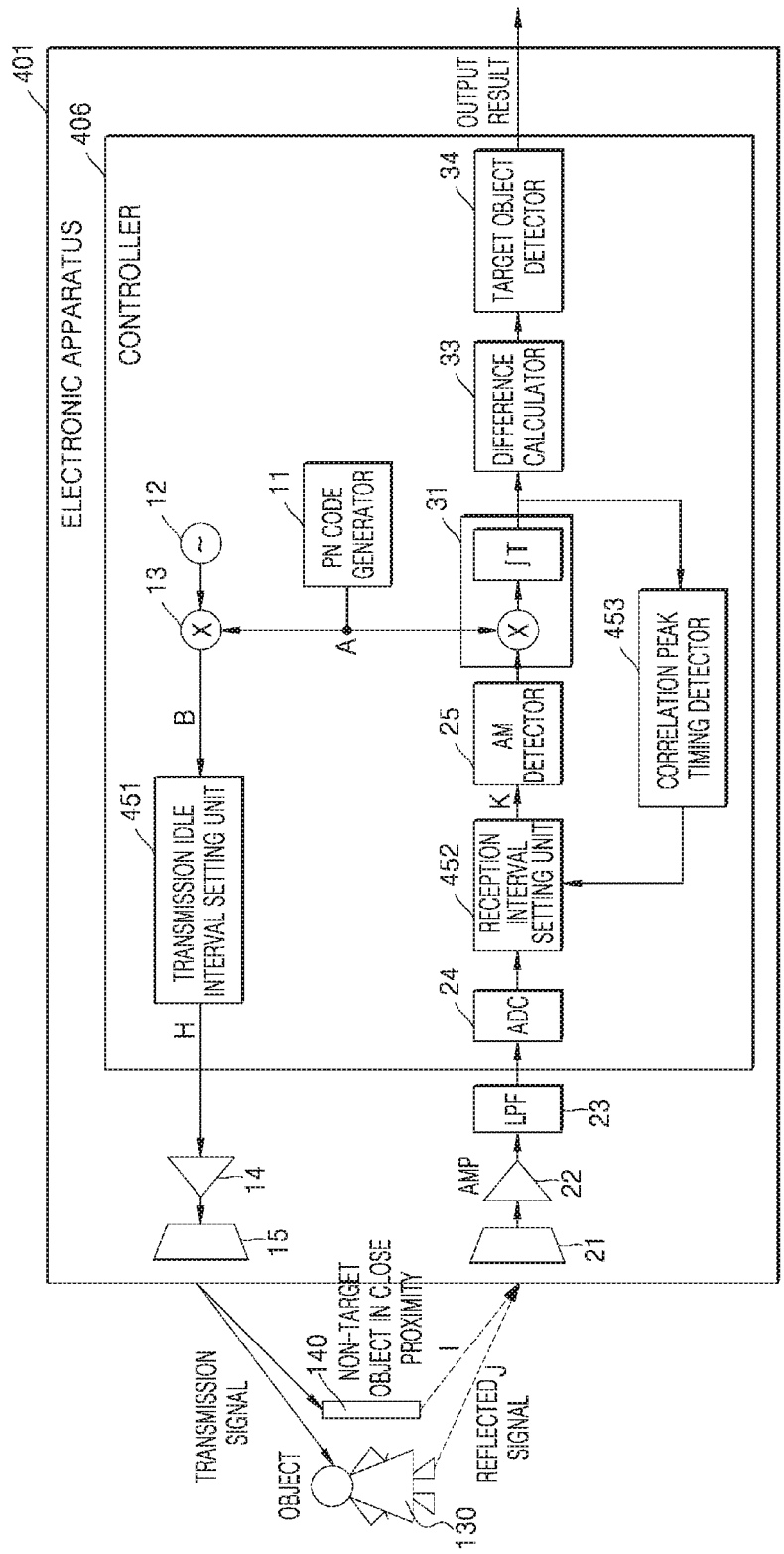
FIG. 20 is a block diagram of a configuration of an electronic apparatus according to another exemplary embodiment.

FIG. 20 is a block diagram of a configuration of an electronic apparatus 401 according to another exemplary embodiment.

According to an exemplary embodiment, the electronic apparatus 401 may periodically set a transmission idle interval that is a time interval when an ultrasound wave is not transmitted and output the transmission idle interval. Furthermore, according to an exemplary embodiment, the electronic apparatus 401 may set a reception interval based on at least one of the transmission idle interval and information about a target object 130 and may acquire a reception signal based on the set reception interval.

According to an exemplary embodiment, the electronic apparatus 401 may periodically set a transmission idle interval for a transmission signal. The electronic apparatus 401 may reduce an effect of at least one of a direct wave and a proximity reflected wave due to a non-target object 140 in close proximity by setting a transmission idle interval and a reception interval and by respectively applying the same to a transmission signal and a reception signal. The direct wave refers to an ultrasound signal directly emitted from an ultrasonic transmitter 15 without being reflected anywhere.

The electronic apparatus 401 may include components respectively corresponding to the PN signal generator 11 and the carrier signal generator 12 included in the electronic apparatus 1 described with reference to FIG. 3. Unlike the electronic apparatus 1, the electronic apparatus 401 may further include a transmission idle interval setting unit 451, a reception interval setting unit 452, and a correlation peak timing detector 453.

Since the PN code generator 11 and the carrier signal generator 12 included in the electronic apparatus 401 have substantially the same configurations and functions as those of their counterparts in the electronic apparatus 1, detailed descriptions thereof will not be repeated below.

However, unlike the PN code generator 11 in the electronic apparatus 1, the PN code generator 11 in the electronic apparatus 401 may generate a PN code with a period of 127 bits to have a value "0" or "1" at time intervals of 1.5 ms (i.e., with one period of 190.5 ms) instead of 1 ms.

The mixer 13 may perform AM on a carrier signal by using the PN code A to generate a transmission signal B. Furthermore, the mixer 13 may generate the transmission signal B (with a duty ratio of 100%) so that components of the transmission signal B are continuous without any gap therebetween and may output the transmission signal B to the transmission idle interval setting unit 451.

The transmission idle interval setting unit 451 may generate an intermittent transmission signal H with a duty ratio of about 20 to about 50% from the transmission signal B so that there is a gap between components of the transmission signal B. For example, the transmission idle interval setting unit may generate the intermittent transmission signal H alternately having a transmission interval of 0.5 ms and a transmission idle interval of 1.0 ms from the transmission signal B and may output the intermittent transmission signal H to a driver circuit 14.

The driver circuit 14 may amplify the intermittent transmission signal H to a predetermined voltage, and the ultrasonic transmitter 15 may convert the amplified intermittent transmission signal H into an ultrasound signal and may emit the ultrasound signal to the outside.

An ultrasonic receiver 21 may receive an echo signal J corresponding to the intermittent transmission signal H reflected from the target object 130 and may convert the echo signal J into an electrical signal. For example, the ultrasonic receiver 21 may receive a proximity reflected signal I with a delay of 0.6 to 0.8 ms from the non-target object 140 in close proximity, and a continuous weak reflected signal J from the target object 130 and may convert the proximity reflected signal I and the reflected signal J into an electrical signal.

An amplifier 22 may amplify the electrical signal obtained by converting the proximity reflected signal I and the reflected signal J and output the amplified electrical signal. The ADC 24 may convert the amplified electrical signal into a digital signal and may output the digital signal to the reception interval setting unit 452.

The reception interval setting unit 452 may set as a reception interval W a time interval during which a signal corresponding to a direct wave or the proximity reflected signal I has a small magnitude or does not exist. The time interval during which a signal corresponding to the direct wave or the proximity reflected signal I has a small magnitude or does not exist may be determined in various ways. By setting the reception interval W, it is possible to block the proximity reflected signal I or direct wave that can be received during a time interval other than the reception interval W. Furthermore, the reception interval setting unit 452 may detect a signal received during the reception interval W, among signals corresponding to the reflected signal J, as an intermittent reception signal K and may output the intermittent reception signal K to an AM detector 25.

According to an exemplary embodiment, the reception interval setting unit 452 may set a length of the reception interval W (e.g., 0.95 ms) to be less than or equal to a length of a transmission idle interval in order to block a signal corresponding to a direct wave or the proximity reflected signal I. Furthermore, the reception interval setting unit 452 may set a period of the reception interval W to be equal to a period of a transmission idle interval (e.g., 1.5 ms).

The reception interval setting unit 452 may also set a reception interval W based on a non-target peak detected by the correlation peak timing detector 453.

For example, the reception interval W may be set in such a manner as to decrease a magnitude of a non-target peak at which a magnitude is greater than a predetermined value in a correlation value and a distance to an object corresponding to the peak is less than a predetermined value.

As another example, a temporal position of the reception interval W may be determined according to a temporal position of a non-target peak at which a magnitude is greater than a predetermined value in a correlation value and a distance to an object corresponding to the peak is less than a predetermined value.

The correlation peak timing detector 453 detects a non-target peak due to the non-target object in close proximity from a correlation value and outputs a position and a magnitude of the detected non-target peak to the reception interval setting unit 452.

The reception interval setting unit 452 may set a reception interval W so that the magnitude of the non-target peak may decrease. For example, the reception interval setting unit 452 may change a reception interval W to around 0.1 ms to adaptively set a position of the reception interval W at which the non-target peak has a smallest magnitude.

Furthermore, according to an exemplary embodiment, although the transmission idle interval setting unit 451 may set a transmission idle interval in the transmission signal B, the PN code generator 11 may instead generate an intermittent PN code having a transmission interval of 0.5 ms and a transmission idle interval of 1.0 ms. Thus, this eliminates the need for the transmission idle interval setting unit 451, and a correlation value calculator 31 may output a correlation value by performing correlation between a demodulated intermittent reception signal K and an intermittent PN code.

According to an exemplary embodiment, the transmission signal B may have a first transmission idle interval for each of code elements "0" and "1", and a receiver (21 through 25) may receive a reflected signal during a reception interval W having a length less than or equal to that of the first transmission idle interval and with the same period as the first transmission idle interval.

The AM detector 25 may perform AM on the intermittent reception signal K and may output the resulting signal to the correlation value calculator 31.

The correlation value calculator 31 may perform correlation between the resulting signal output after performing the AM and the PN code A to output a correlation value to a difference calculator 33 and to the correlation peak timing detector 453.

The correlation value generated by the correlation value calculator 31 may be affected slightly by a direct wave or proximity reflected wave by setting a reception interval W. For example, in the correlation value, a peak (non-target peak) produced by a direct wave or proximity reflected wave may decrease in magnitude or disappear while a peak produced due to the target object 130 may become more distinct.

The difference calculator 33 may calculate a difference between correlation values corresponding to two temporally consecutive frames and may output the difference to a target object detector 34. The target object detector 34 may detect the presence or absence of the target object 130 based on the difference.

Thus, according to exemplary embodiments, the electronic apparatus 401 is able to detect the target object 130 with high precision by reducing the effects of a direct wave or proximity reflected signal.

Figure 21:
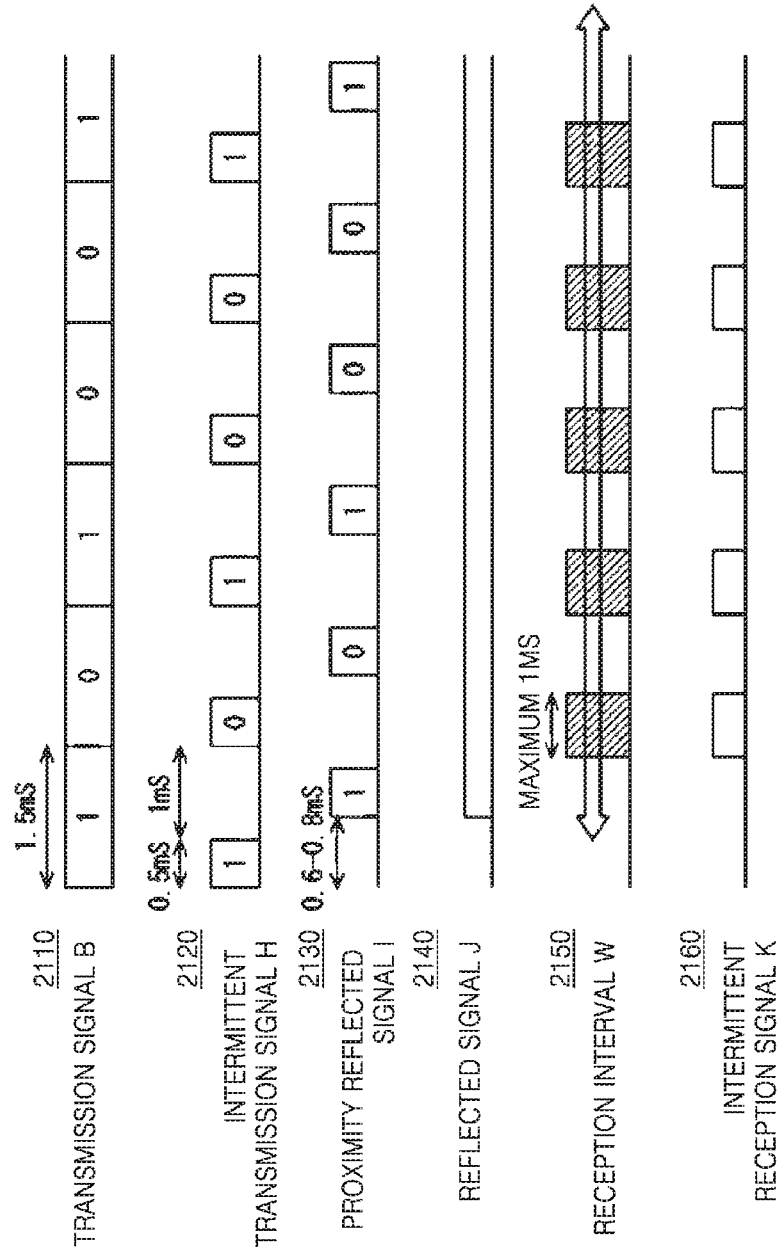
FIG. 21 is a diagram for explaining signals processed by an electronic apparatus according to an exemplary embodiment.

FIG. 21 is a diagram for explaining signals processed by the electronic apparatus 401 according to an exemplary embodiment.

Referring to FIG. 21, transmission signal B, intermittent transmission signal H, proximity reflected signal I, reflected signal from a target object to be detected, reception interval W, and intermittent reception signal K are arranged sequentially from top to bottom. The abscissa and ordinate respectively represent the time and a magnitude of each signal or interval.

Referring to 2120 of FIG. 21, the intermittent transmission signal H may have a transmission interval of 0.5 ms and a transmission idle interval of 1.0 ms. However, exemplary embodiments are not limited thereto, and lengths of the transmission interval and transmission idle interval may vary depending on an estimated temporal position of a direct wave or proximity reflected wave or depending on a configuration of the electronic apparatus 401.

Referring to 2150 and 2160 of FIG. 21, an arrow superimposed on the reception interval W indicates a position at which the reception interval W is to be set. Referring to 2130 and 2160, the reception interval W may be set to a time interval during which the proximity reflected signal I is not received.

Figure 22:
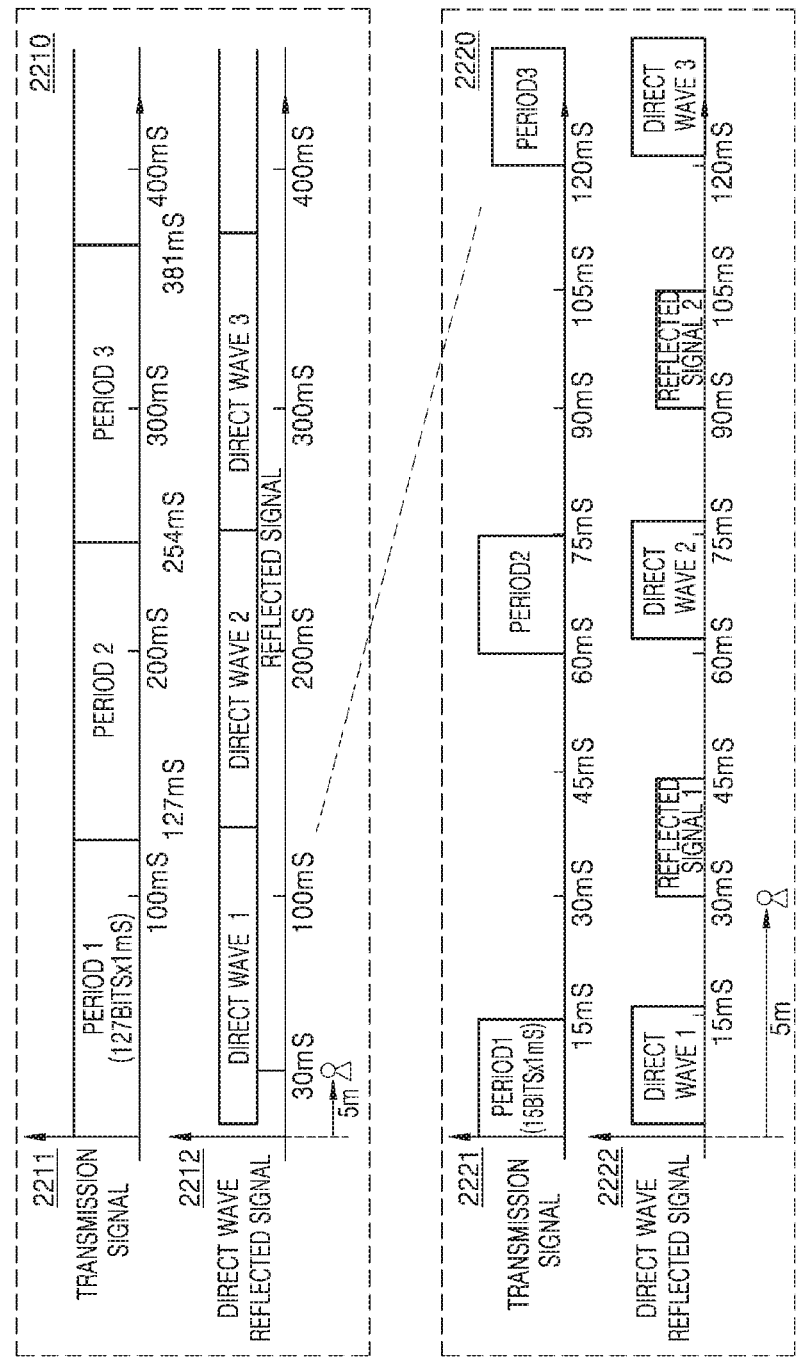
FIG. 22 is a diagram for explaining a relationship among a transmission signal, a direct wave, and a reflected signal according to an exemplary embodiment.

FIG. 22 is a diagram for explaining a relationship among a transmission signal, a direct wave, and a reflected signal according to an exemplary embodiment.

According to an exemplary embodiment, the electronic apparatus 401 may reduce the effects of a direct wave or proximity reflected wave by setting a transmission idle interval for each period of a code signal.

According to an exemplary embodiment, the PN code generator 11 of the electronic apparatus 401 may generate, at intervals of 60 ms, a PN code having a value "0" or "1" at time intervals of 1 ms and with a period of 15 bits.

Referring to FIG. 22, 2210 illustrates a transmission signal, a direct wave, and a reflected signal for which a transmission idle interval is not set, according to a comparative example. On the other hand, 2220 illustrates a transmission signal, a direct wave, and a reflected signal for which a transmission idle interval is set, according to an exemplary embodiment. The abscissa and ordinate respectively represent the time and a magnitude of each signal.

Referring to 2210, the PN code generator 11 may continuously generate a 127-bit PN code having a period of 127 ms. The ultrasonic transmitter 15 may continuously output an ultrasound signal (transmission signal) according to continuously generated PN codes. The ultrasonic receiver 21 may continuously receive a strong direct wave or proximity reflected signal with little delay or a weak reflected signal with a slight delay and from the target object 130. Thus, the reflected signal from the target object 130 may be buried in the direct wave or may be proximity reflected so that it is not clearly distinguishable.

Referring to 2220, the PN code generator 11 may continuously generate a 15-bit PN code having a period of 15 ms and a transmission idle interval of 45 ms. The PN code generated by the PN code generator 11 may include a signal alternately having a transmission interval and a transmission idle interval. The ultrasonic transmitter 15 may emit an ultrasound wave, alternating between a transmission interval of 15 ms and a transmission idle interval of 45 ms, according to the PN code.

The ultrasonic receiver 21 may receive a reflected signal only during a period (about 15 ms) having a length corresponding to a transmission interval. In an example shown on 2220 of FIG. 22, the ultrasonic receiver 21 may receive a reflected signal from a person located 5 m away only during a period (about 15 ms) having a length corresponding to a transmission interval in order to prevent the effects of a direct wave or proximity reflected wave.

According to an exemplary embodiment, the correlation value calculator 31 of the electronic apparatus 401 may calculate a correlation value between a signal corresponding to a previous one period (15 ms) of the demodulated reception signal D output from the AM detector 25 and a signal corresponding to one period (15 ms) of the PN code for each sample of the demodulated reception signal D (e.g., for each time interval of 0.01 ms when the sampling frequency of the ADC 24 is 100 kHz).

Thus, according to exemplary embodiments, by blocking a reception signal during a time interval estimated as an interval when a direct wave or proximity reflected wave is to be received, the electronic apparatus 401 is capable of detecting the presence or absence of the target object 130 with high accuracy regardless of a distance between the electronic apparatus 401 and the target object 130.

Figure 23:
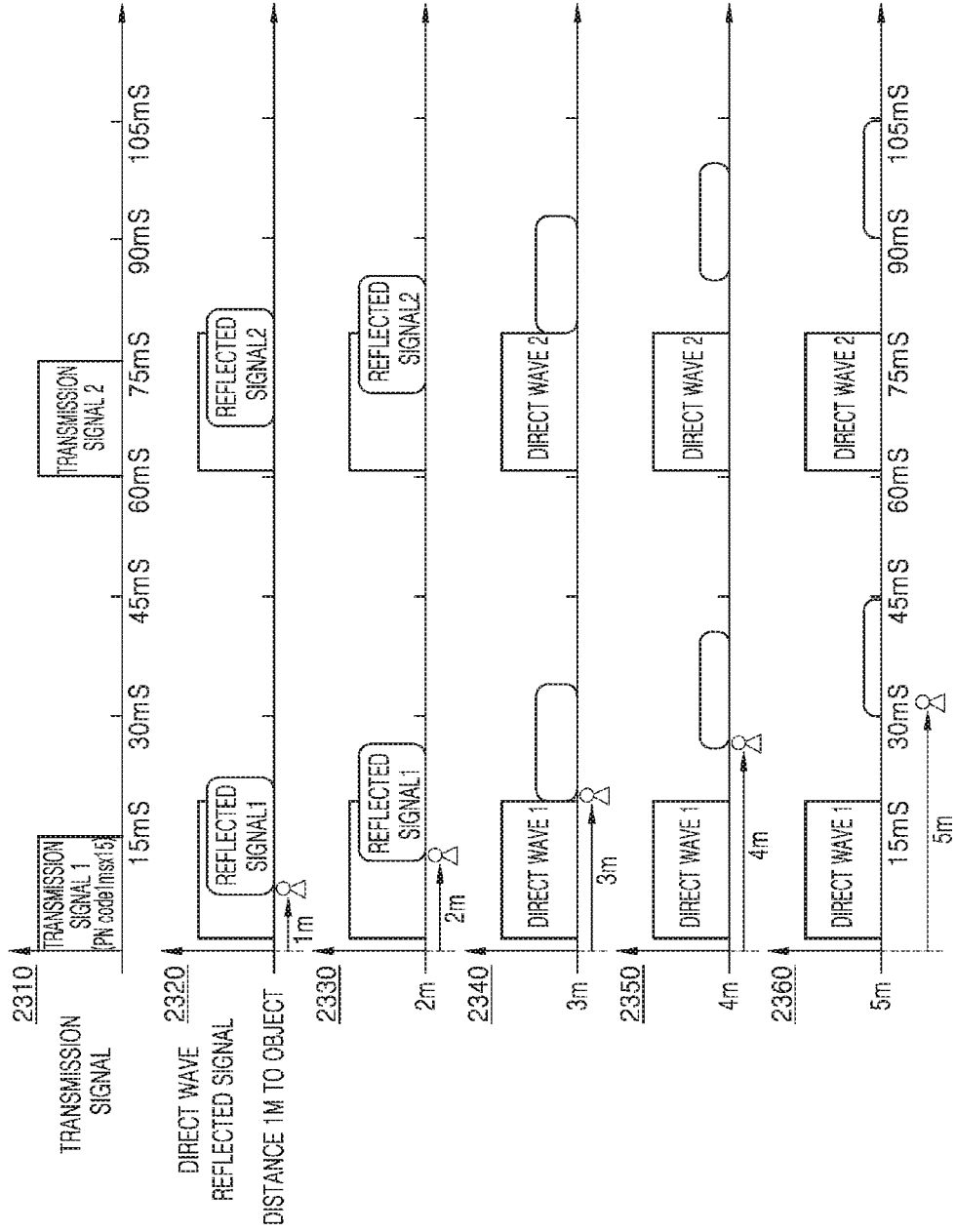
FIG. 23 is another diagram for explaining a relationship among a transmission signal, a direct wave, and a reflected signal according to an exemplary embodiment.

FIG. 23 is another diagram for explaining a relationship among a transmission signal, a direct wave, and a reflected signal according to an exemplary embodiment.

Referring to FIG. 23, 2310 illustrates a transmission signal, and 2320 through 2360 illustrate a direct wave and a reflected signal when a distance to the target object 130 is 1 to 5 m. The abscissa and ordinate respectively represent the time and a magnitude of each signal.

The transmission signal shown on 2310 of FIG. 23 may correspond to the transmission signal shown on 2221 of FIG. 22. The transmission signal shown on 2310 of FIG. 23 may be produced according to a PN code having a value "0" or "1" at time intervals of 1 ms and a period of 15 bits and generated at intervals of 60 ms.

When a distance to the target object 130 is 1 to 2 m, a direct wave and a reflected signal overlap to a large extent, but the reflected signal has a relatively high intensity. On the other hand, when the distance to the target object 130 is 3 to 5 m, since a reflected signal has a low intensity but does not overlap a direct wave, the electronic apparatus 401 may detect the target object 130 from a reflected signal with high accuracy.

Thus, according to exemplary embodiments, as a distance to the target object 130 increases and the intensity of a reflected signal from the target object 130 decreases, the effects of a direct wave and a proximity reflected wave may be reduced.

Figure 24:
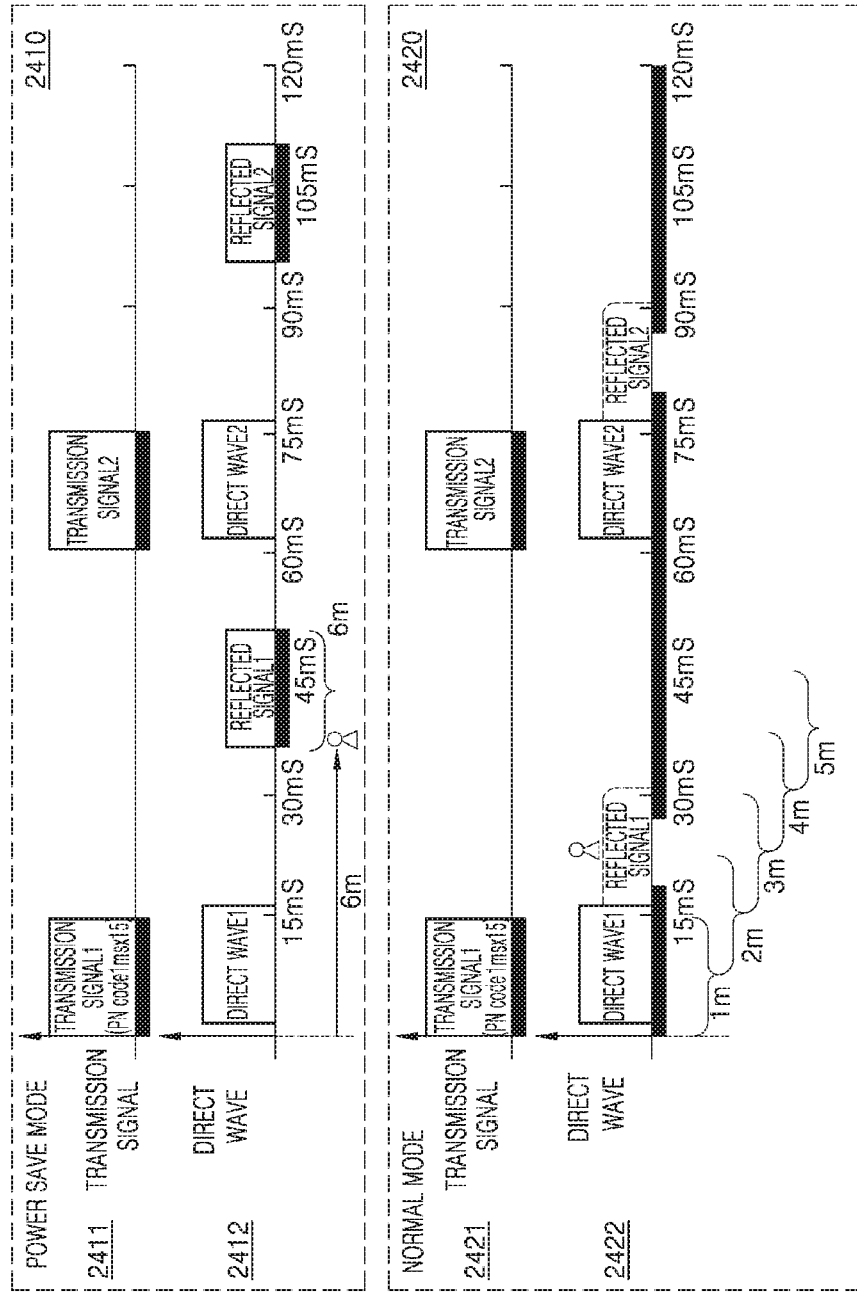
FIG. 24 is a diagram for explaining an example of an operation of an electronic apparatus in a power save mode according to an exemplary embodiment.

FIG. 24 is a diagram for explaining an example of an operation of the electronic apparatus 1 in a power save mode according to an exemplary embodiment According to an exemplary embodiment, when in a power save mode, the electronic apparatus 1 may receive a reflected signal based on a preset reception interval and may reset a reception interval based on information about the target object 130 detected by a received reflected signal. The electronic apparatus 1 may then transit from the power save mode to a normal mode and may receive a reflected signal according to the reset reception interval.

Referring to FIGS. 24, 2410 and 2420 respectively illustrate a transmission signal, a direct wave, and a reflected signal when the electronic apparatus 1 is in a power save mode and in a normal mode. The abscissa and ordinate respectively represent the time and a magnitude of each signal. Bold lines below the abscissa indicate time intervals during which the electronic apparatus 1 operates.

According to an exemplary embodiment, the electronic apparatus 1 may operate in a power save mode and in a normal mode.

Referring to 2411 and 2412 of FIG. 24, the electronic apparatus 1 may set a reception interval in a power save mode. For example, when in a power save mode, the electronic apparatus 1 may set a reception interval of 15 ms at a position corresponding to a delay of 35 to 50 ms from transmission of an ultrasound wave in order to detect the target object 130 that is located at a predetermined distance (e.g., 6 m) from the electronic apparatus 1. In addition, as a transmission interval and a reception signal are both set to 15 ms, power consumption may be reduced.

The predetermined distance may be preset by the user or be set based on a result of measuring a position of the target object 130 by using other methods. As another example, the predetermined distance may be set to a maximum distance at which the electronic apparatus can detect the presence or absence of the target object 130. Exemplary embodiments are not limited thereto, and the predetermined distance may be preset by using other various methods.

According to an exemplary embodiment, when the electronic apparatus 1 detects the target object 130 while operating in a power save mode, the electronic apparatus 1 may change an operating mode to a normal mode and reset a reception interval to a continuous period to receive a reflected signal. According to an exemplary embodiment, in the normal mode, information about a position of the target object 130 that is less than a predetermined distance away from the electronic apparatus 1.

According to an exemplary embodiment, by including the plurality of difference calculators 133a through 133m, the plurality of target object detectors 134a through 134m, and the target object number and distance determiner 135, the electronic apparatus 1 may detect at least one of a distance to the target object 130 and the number of target objects 130. For example, by respectively corresponding a plurality of reception intervals (reception periods) to distances (e. g., 1 to 5 m) to the target object 130, the electronic apparatus 1 may detect at least one of a distance to the target object 130 and the number of target objects 130.

According to an exemplary embodiment, a transmission signal output by the electronic apparatus 1 may alternately have a transmission interval corresponding to one period of a specific code (e.g., a PN code) and a second transmission idle interval. By using a transmission signal having the second transmission idle interval, according to an exemplary embodiment, the electronic apparatus 1 may calculate a difference between correlation values corresponding to two consecutive frames with a time period corresponding to the second transmission idle interval therebetween. The electronic apparatus 1 may detect information about the target object 130 based on the difference between correlation values.

Thus, according to exemplary embodiments, the electronic apparatus 1 is able to detect the target object 130 with high precision by reducing the effects of a direct wave or proximity reflected wave.

Furthermore, according to exemplary embodiments, since the receiver (21 through 25) of the electronic apparatus 1 has a reception interval of approximately the same length as a transmission interval, power consumption may be reduced.

Furthermore, according to an exemplary embodiment, the electronic apparatus 1 may further include a distance calculator (not shown) for calculating a distance by respectively corresponding a plurality of reception intervals to distances to the target object 130 and the receiver (21 through 25) having a plurality of reception intervals. According to an exemplary embodiment, the target object detector 34 of the electronic apparatus 1 may detect information about the target object 130 for each reception interval, and the distance calculator may calculate a distance to the target object 130 based on a reception interval. Thus, according to an exemplary embodiment, the electronic apparatus 1 may simultaneously detect a plurality of target objects 130 that are at different distances away from the electronic apparatus 1.

Exemplary embodiments described herein may be implemented through one or more non-transitory computer-readable recording media having recorded thereon computer-executable instructions such as program modules that are executed by a computer. The non-transitory computer-readable recording media may be any available media that can be accessed by a computer and include both volatile and nonvolatile media and both detachable and non-detachable media. Furthermore, the non-transitory computer-readable recording media may include computer storage media and communication media. The computer storage media include both volatile and nonvolatile and both detachable and non-detachable media implemented by any method or technique for storing information such as computer-readable instructions, data structures, program modules, or other data. The communication media typically embody computer-readable instructions, data structures, or program modules, and may include any information transmission media.

Furthermore, in the present specification, the term "unit" may be a hardware component such as a processor or circuit and/or a software component that is executed by a hardware component.

The above description is provided for illustration, and it will be understood by those of ordinary skill in the art that various changes in form and details may be made therein without departing from essential features and the spirit and scope of the present disclosure as defined by the following claims. Accordingly, the above exemplary embodiments and all aspects thereof are examples only and are not limiting. For example, each component defined as an integrated component may be implemented in a distributed fashion. Likewise, components defined as separate components may be implemented in an integrated manner.

The scope of the present disclosure is defined not by the detailed description thereof but by the appended claims, and all changes or modifications within the spirit and scope of the appended claims and their equivalents will be construed as being included in the present disclosure.

What is claimed is:

1. An electronic apparatus comprising:
   a transmitter configured to emit an ultrasound wave modulated based on a predetermined code signal;
   a receiver configured to receive a reflected signal corresponding to the emitted ultrasound wave reflected from a target object; and
   at least one processor configured to obtain a reception signal from the received reflected signal and to identify whether the target object is located within a predetermined distance from the electronic apparatus in a first time period based on a first correlation difference for the first time period and a second time period, adjacent to the first time period, based on a second correlation difference for the second time period, the first correlation difference for the first time period being a difference between a first correlation value and a second correlation value and the second correlation difference for the second time period being a difference between the second correlation value and a third correlation value,
   wherein the first correlation value represents a correlation between the reception signal and the predetermined code signal in the first time period,
   wherein the second correlation value represents a correlation between the reception signal and the predetermined code signal in the second time period,
   wherein the third correlation value represents a correlation between the reception signal and the predetermined code signal in a third time period adjacent to the second time period, the second time period being between the first time period and the third time period,
   wherein the at least one processor is further configured to obtain a variance between the first correlation difference and the second correlation difference, and
   wherein the at least one processor is further configured to identify that the target object is located within the predetermined distance from the electronic apparatus based on whether or not the first correlation difference exceeds a first predetermined threshold and whether or not the variance exceeds a second predetermined threshold.

2. The electronic apparatus of claim 1, further comprising an amplitude modulation detector which obtains the reception signal by demodulating the received reflected signal.

3. The electronic apparatus of claim 1, wherein the at least one processor is further configured to:
   identify an environment frame as time interval during which the target object is not located within the predetermined distance from the electronic apparatus based on a correlation difference for the time interval, and
   identify whether the target object is located within the predetermined distance from the electronic apparatus in the first time period based on an environment frame differential as a differential between a correlation value of the environment frame and the first correlation value.

4. The electronic apparatus of claim 1, wherein the at least one processor is further configured to detect, based on the first correlation difference, a number of target objects located within the predetermined distance from the electronic apparatus in the first time period.

5. The electronic apparatus of claim 1, wherein the at least one processor is further configured to identify a plurality of time periods during which the target object is located within the predetermined distance from the electronic apparatus based on correlation differences for the plurality of time periods, to obtain a maximum correlation value in the plurality of time periods, and to detect position information of the target object based on a time point at which the maximum correlation value is obtained.

6. The electronic apparatus of claim 1, wherein the at least one processor is further configured to:
   generate a cancellation signal, wherein the cancellation signal is a signal having an amplitude greater than the first predetermined threshold selected from among signals included in the reception signal, and
   identify whether the target object is located within the predetermined distance from the electronic apparatus based on a signal obtained by subtracting the cancellation signal from the reception signal.

7. The electronic apparatus of claim 1, wherein the transmitter is further configured to periodically set and output a transmission idle interval that is a time interval when the ultrasound wave is not transmitted, and
   wherein the at least one processor is further configured to:
      set a reception interval based on at least one of the transmission idle interval and information about the target object; and
      obtain the reception signal based on the reception interval.

8. The electronic apparatus of claim 1, wherein the receiver is further configured to:
   receive the reflected signal based on a preset reception interval,
   reset a reception interval based on whether or not the target object is located within the predetermined distance from the electronic apparatus in the first time period identified based on the received reflected signal, and
   receive the reflected signal according to the reset reception interval.

9. A method, performed by an electronic apparatus, of detecting information about a target object by using an ultrasound wave, the method comprising:
   emitting the ultrasound wave modulated based on a predetermined code signal;
   receiving a reflected signal corresponding to the emitted ultrasound wave reflected from the target object;
   obtaining a reception signal from the received reflected signal; and
   identifying whether the target object is located within a predetermined distance from the electronic apparatus in a first time period based on a first correlation difference for the first time period and a second time period, adjacent to the first time period, based on a second correlation difference for the second time period, the first correlation difference for the first time period being a difference between a first correlation value and a second correlation value and the second correlation difference for the second time period being a difference between the second correlation value and a third correlation value;

obtaining a variance between the first correlation difference and the second correlation difference, wherein the first correlation value represents a correlation between the reception signal and the predetermined code signal in the first time period, wherein the second correlation value represents a correlation between the reception signal and the predetermined code signal in the second time period, wherein the third correlation value represents a correlation between the reception signal and the predetermined code signal in a third time period adjacent to the second time period, the second time period being between the first time period and the third time period, and wherein the identifying of whether the target object is located within the predetermined distance from the electronic apparatus in the first time period comprises identifying that the target object is located within the predetermined distance from the electronic apparatus based on whether or not the first correlation difference exceeds a first predetermined threshold and whether or not the variance exceeds a second predetermined threshold.

10. The method of claim 9, wherein the obtaining the reception signal comprises demodulating the received reflected signal.

11. The method of claim 9, wherein the identifying of whether the target object is located within the predetermined distance from the electronic apparatus in the first time period comprises:

identifying an environment frame as time interval during which the target object is not located within the predetermined distance from the electronic apparatus based on a correlation difference for the time interval; and identifying whether the target object is located within the predetermined distance from the electronic apparatus in the first time period based on an environment frame differential as a differential between a correlation value of the environment frame and the first correlation value.

12. The method of claim 9, wherein the identifying of whether the target object is located within the predetermined distance from the electronic apparatus in the first time period comprises:

detecting, based on the first correlation difference, a number of target objects located within the predetermined distance from the electronic apparatus in the first time period.

13. The method of claim 9, wherein the identifying of whether the target object is located within the predetermined distance from the electronic apparatus in the first time period comprises:

identifying a plurality of time periods during which the target object is located within the predetermined distance from the electronic apparatus based on correlation differences for the plurality of time periods;

obtaining a maximum correlation value in the plurality of time periods; and detecting position information of the target object based on a time point at which the maximum correlation value is obtained.

14. The method of claim 9, wherein the identifying of whether the target object is located within the predetermined distance from the electronic apparatus in the first time period comprises:

generating a cancellation signal by selecting, from among signals included in the reception signal, a signal having an amplitude greater than the first predetermined threshold; and identifying of whether the target object is located within the predetermined distance from the electronic apparatus in the first time period based on a signal obtained by subtracting the cancellation signal from the reception signal.

15. The method of claim 9, wherein the emitting of the ultrasound wave comprises periodically setting and outputting a transmission idle interval that is a time interval when the ultrasound wave is not transmitted, and wherein the obtaining of the reception signal comprises:

setting a reception interval based on at least one of the transmission idle interval and the information about the target object and obtaining the reception signal based on the reception interval.

* * * * *